US008832195B2

(12) United States Patent
Rama Rao et al.

(10) Patent No.: US 8,832,195 B2
(45) Date of Patent: Sep. 9, 2014

(54) SOCIAL NETWORK DATA ANALYSIS TO GENERATE INCENTIVES FOR ONLINE GAMING

(75) Inventors: Sudhir Kumar Rama Rao, San Jose, CA (US); Ara Nicholas Yessayan, Jr., San Francisco, CA (US); Paul David Bettner, McKinney, TX (US); David Bettner, McKinney, TX (US); Paolo Malabuyo, San Francisco, CA (US); Benjamin F. Gregorski, Mountain View, CA (US); Michael Chow, Allen, TX (US); Yie Lyn Choo, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 85 days.

(21) Appl. No.: 13/601,975

(22) Filed: Aug. 31, 2012

(65) Prior Publication Data

US 2014/0006505 A1    Jan. 2, 2014

Related U.S. Application Data

(63) Continuation-in-part of application No. 13/537,846, filed on Jun. 29, 2012, and a continuation-in-part of application No. 13/537,899, filed on Jun. 29, 2012.

(51) Int. Cl.
*G06F 15/16* (2006.01)

(52) U.S. Cl.
USPC ........................................................ 709/204

(58) Field of Classification Search
USPC ............ 709/200, 201, 202, 203, 204; 463/42
See application file for complete search history.

(56) References Cited

U.S. PATENT DOCUMENTS

| | | | |
|---|---|---|---|
| 6,203,433 B1* | 3/2001 | Kume | 463/42 |
| 6,216,112 B1* | 4/2001 | Fuller et al. | 705/14.19 |
| 6,352,479 B1* | 3/2002 | Sparks, II | 463/42 |
| 6,364,769 B1* | 4/2002 | Weiss et al. | 463/29 |
| 6,816,904 B1* | 11/2004 | Ludwig et al. | 709/226 |
| 7,955,175 B1* | 6/2011 | Holloway et al. | 463/42 |
| 8,317,622 B2* | 11/2012 | Gura et al. | 463/42 |
| 8,721,450 B2* | 5/2014 | Walker et al. | 463/42 |
| 2002/0083179 A1* | 6/2002 | Shaw et al. | 709/227 |
| 2005/0171955 A1* | 8/2005 | Hull et al. | 707/10 |
| 2005/0192097 A1* | 9/2005 | Farnham et al. | 463/42 |
| 2007/0117629 A1* | 5/2007 | Fowler et al. | 463/42 |
| 2007/0173329 A1* | 7/2007 | Landsem | 463/42 |
| 2008/0146338 A1* | 6/2008 | Bernard et al. | 463/42 |
| 2009/0075738 A1* | 3/2009 | Pearce | 463/42 |
| 2009/0197681 A1* | 8/2009 | Krishnamoorthy et al. | 463/42 |
| 2009/0264202 A1* | 10/2009 | Chen et al. | 463/42 |
| 2011/0159966 A1* | 6/2011 | Gura et al. | 463/42 |

(Continued)

*Primary Examiner* — Sargon Nano
(74) *Attorney, Agent, or Firm* — Martine Penilla Group, LLP

(57) ABSTRACT

Systems and methods for processing recommendations of online games to friends of social network are described. A method for processing recommendations includes identifying a gaming session of a user on an online game provider network, accessing a use profile of the user for the online games of the online game provider network, and accessing a social graph of the user to identify friends of the user and respective friend profiles from the social network. The method further includes producing a recommendation of an online game. The recommendation includes an identification of a target friend of the user and is being provided by examination of the use profile of the user and friend profiles in the social graph. The method includes providing the recommendation to the user. The recommendation also includes an offer incentive to the user to share the recommendation with the target friend.

22 Claims, 15 Drawing Sheets

(56) References Cited

U.S. PATENT DOCUMENTS

| | | | |
|---|---|---|---|
| 2011/0246907 A1* | 10/2011 | Wang et al. | 715/751 |
| 2012/0028713 A1* | 2/2012 | Driemeyer et al. | 463/42 |
| 2012/0041907 A1* | 2/2012 | Wang et al. | 706/12 |
| 2012/0157212 A1* | 6/2012 | Kane et al. | 463/42 |
| 2012/0259693 A1* | 10/2012 | Dao | 705/14.27 |
| 2013/0005476 A1* | 1/2013 | Keswani et al. | 463/42 |
| 2013/0005477 A1* | 1/2013 | McCaffery et al. | 463/42 |
| 2013/0080242 A1* | 3/2013 | Alhadeff et al. | 705/14.39 |
| 2013/0237300 A1* | 9/2013 | Johnson | 463/13 |
| 2013/0346225 A1* | 12/2013 | Karlsson | 705/26.1 |
| 2014/0032349 A1* | 1/2014 | Yerli | 705/26.1 |

* cited by examiner

SOCIAL NETWORK DATA ANALYSIS TO GENERATE INCENTIVES FOR ONLINE GAMING

CLAIM OF PRIORITY

This application is a continuation-in-part of and claims the benefit of and priority, under 35 U.S.C. §120, to application Ser. No. 13/537,846, filed on Jun. 29, 2012 and titled "Social Network Data Analysis to Generate Suggestion Metrics for Online Gaming", which is incorporated by reference herein in its entirety.

This application is a continuation-in-part of and claims the benefit of and priority, under 35 U.S.C. §120, to application Ser. No. 13/537,899, filed on Jun. 29, 2012 and titled "Social Network Data Analysis to Provide News for Online Gaming", which is incorporated by reference herein in its entirety.

FIELD

The present disclosure relates to methods and systems for generating incentives for online games.

BACKGROUND

In online games, a number of users play a game with each other via a local area network, a wide area network, or a combination thereof. Also, some online games allow a user to play the game with a computer processor or a server processor rather than with another user. The online games are usually provided by a game provider, who is an entity that develops games.

Some users play games for a large amount of time. However, some users do not play an online game that is offered by the game provider. For example, a logo of a game or a name of a game may not trigger an interest of a user to play the game. As a result, amount of hours, effort, and costs spent by the game developer may be wasted.

It is within this context that embodiments described in the present disclosure arise.

SUMMARY

Embodiments described in the present disclosure provide methods and systems for generating incentives for online gaming.

In a number of embodiments, an incentive is provided to a user to recommend a game to a target friend. The recommendation of a game may be generated based on data regarding the user, data regarding the target friend, data regarding use of the game by the target friend, and/or data regarding use of the game by the user. When the game is recommended to the target friend, the user receives incentives for playing the game or another game. For example, the user receives a virtual item for playing a Poker game or an action game. As another example, the user is promoted with a game level or an energy level during play of a game.

In several embodiments, when the target friend accesses the game that is recommended by the user, the target friend receives offer promotions, e.g., virtual items, energy level, game level, free game play, discounted game play, etc. Also, in a number of embodiments, when the target friend accesses the game that is recommended by the user, the user receives incentives to play a game.

In some embodiments, a method for providing recommendations of online games to friends of social network is described. The method includes identifying a gaming session of a user on an online game provider network, accessing a use profile of the user for the online games of the online game provider network, and accessing a social graph of the user to identify friends of the user and respective friend profiles from the social network. The method further includes producing a recommendation of an online game. The recommendation includes an identification of a target friend of the user and is being provided by examination of the use profile of the user and friend profiles in the social graph. The method includes providing the recommendation to the user. The recommendation also includes an offer incentive to the user to share the recommendation with the target friend. The method is executed by one or more processors.

In various embodiments, a system for providing recommendations of online games to friends of a social network is described. The system includes a memory device for storing a use profile of a user for the online games of an online game provider network. The system further includes a processor for identifying a gaming session of the user on the online game provider network. The processor is used for accessing the use profile of the user for the online games, for accessing a social graph of the user to identify friends of the user and respective friend profiles from the social network and for producing a recommendation of an online game. The recommendation includes an identification of a target friend of the user. The recommendation is provided by examination of the use profile of the user and friend profiles in the social graph. The recommendation includes an offer incentive to the user to share the recommendation with the target friend.

In a number of embodiments, a method for providing recommendations of online games to friends of a social network is described. The method includes identifying a gaming session of a user on an online game provider network, accessing a use profile of the user for the online games of the online game provider network, and accessing a social graph of the user to identify friends of the user and respective friend profiles from the social network. The method further includes producing a recommendation of an online game. The recommendation includes an identification of a target friend the user. The recommendation is being provided by examination of the use profile of the user and friend profiles in the social graph. The method further includes providing the recommendation to the user. The recommendation includes an offer incentive to the user to share the recommendation with the target friend. The method also includes determining whether the recommendation is shared with the target friend, providing a reward within the offer incentive to the user upon determining that the recommendation is shared with the target friend, determining whether the target friend accessed the online game, and sending an offer promotion for the target friend upon determining that the target friend accessed the online game. The method is executed by one or more processors Other aspects described in the present disclosure will become apparent from the following detailed description, taken in conjunction with the accompanying drawings, illustrating by way of example the principles of various embodiments described in the present disclosure.

BRIEF DESCRIPTION OF THE DRAWINGS

Various embodiments described in the present disclosure may best be understood by reference to the following description taken in conjunction with the accompanying drawings in which.

DETAILED DESCRIPTION

It should be noted that various embodiments described in the present disclosure may be practiced without some or all of these specific details. In other instances, well known process operations have not been described in detail in order not to unnecessarily obscure various embodiments described in the present disclosure.

Figure 1:
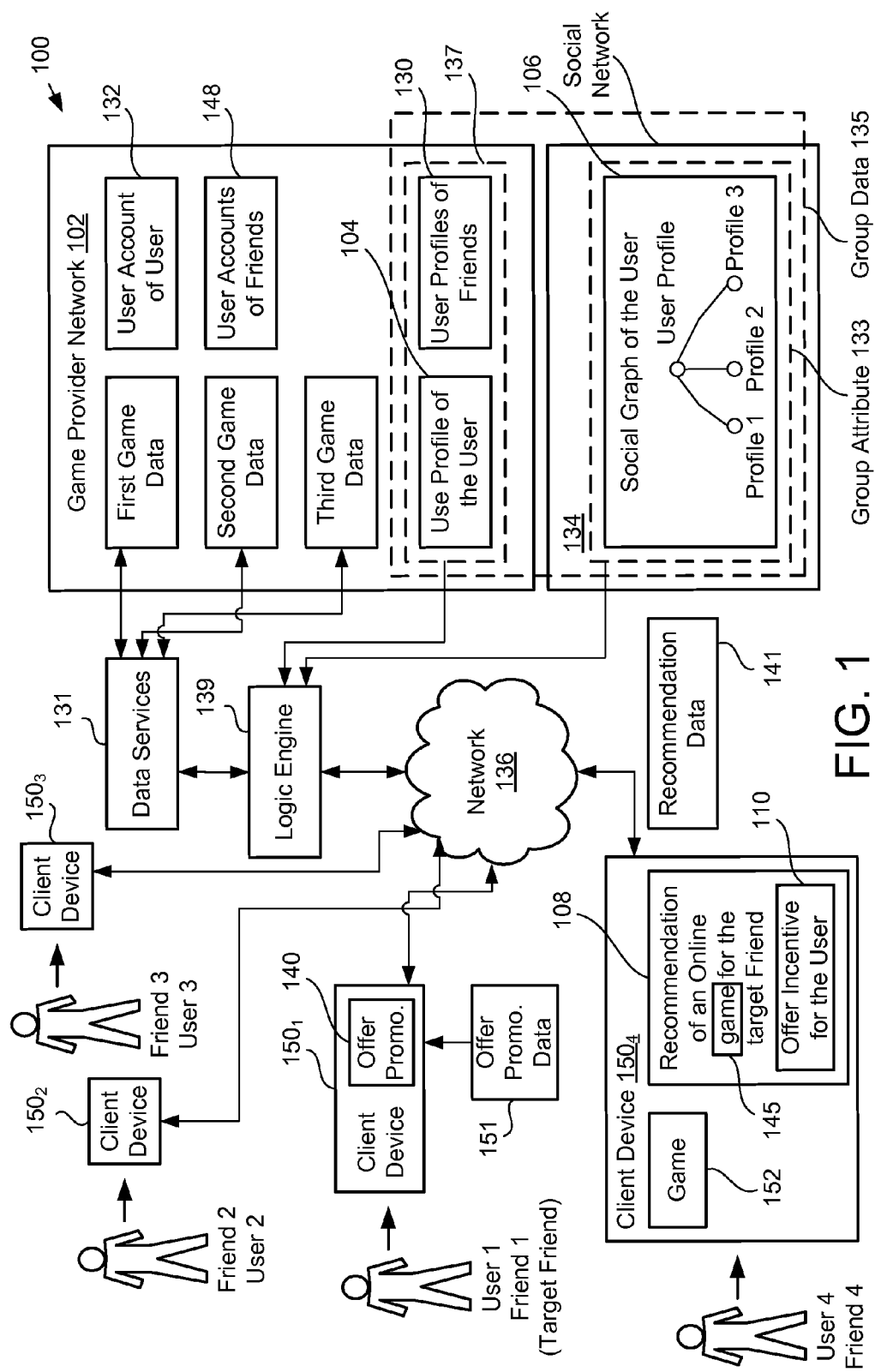
FIG. 1 is a diagram of an architecture for offering incentives to users for sharing game information, in accordance with one embodiment described in the present disclosure.

FIG. 1 is a diagram of an embodiment of an architecture 100 for offering incentives to users for sharing game information. The term "game", as used herein, means a virtual game. For example, the term "game" excludes real world sports that are played on a real landscape, such as grass, field, etc. As another example, a "game" is played on virtual grass or in a virtual field. As another example, a "game" is played via the Internet or the World Wide Web.

A data services module 131 collects data regarding one or more games. For example, the data services module 131 collects first game data that is rendered at a client device to identify or play a first game, collects second game data that is rendered at a client device to identify or play a second game, and collects third game data that is rendered at a client device to identify or play a third game. In several embodiments, the data services module 131 collects game data for any number of games. Also, the first game is different than the second game and the third game, and the second game is different than the third game. For example, the first game has different rules than that of the second game, has different prizes than that in the second game, has different virtual characters than that in the second game, has different multimedia than that in the second game, has different data than that in the second game, or a combination thereof.

A game is identified using a name the game, a logo of the game, a brand of the game, or a combination thereof. For example, a poker game that is developed by Zynga™ Corporation of San Francisco, Calif. is named Zyngapoker™. As another example, a crossword puzzle game that is developed by Zynga Corporation is named "WORDS with Friends™".

Examples of a client device include a mobile device and a desktop computer. Examples of a mobile device include a laptop, a smart phone, a cell phone, a personal digital assistant, and a tablet.

Examples of a game include a game that is used to collect virtual coins, a game that is used to collect virtual items, a game that is played with virtual friends, a game that is played with social network friends, a game that is played to fight with virtual enemies, a Poker game, a game that is played to build a virtual city, a game that is played to build a virtual farm, a game that is played to follow virtual clues to solve a virtual puzzle and to achieve a virtual goal, and a game in which players take turns building words crossword puzzle style with an opponent.

The data services module 131 further obtains a portion of group data 135, which includes information about a group of friends, e.g., friend 1, friend 2, friend 3, etc., of a user 4, who is a friend 4. For example, the data services module 131 accesses, e.g., reads, group attribute data 133 from one or more memory devices. Examples of a memory device include a read-only memory (ROM), a random access memory (RAM), or a combination thereof. To illustrate, examples of a memory device include a flash memory, a disk array, and a hard disk.

In a number of embodiments, the friends of the user 4 are social network friends of the user 4. For example, the user 4 uses the client device $150_4$ to send a request via a web account of the user 4 within a social network 134 to add other users, e.g., user 1, user 2, user 3, etc., as social network friends 1, 2, and 3 of the user 4. The web account is assigned to the user 4 within the social network 134. When the other users accept the request, the other users become social network friends of the user 4. Similarly, the user 4 becomes a network friend of the other users when the user 4 accepts requests sent via web accounts of the other users within the social network 134 to become social network friends of the other users. In several embodiments, when the other users become social network friends of the user 4, the other users can access via their web accounts, multimedia and/or data, e.g., text, image, video, audio, that is posted by the user 4 in his/her web account and that is restricted from access by anyone other than social network friends of the user 4.

In a number of embodiments, a friend is an example of a user. For example, the user 1 is friend 1, the user 2 is friend 2, and the user 3 is friend 3.

In various embodiments, the other users are acquaintances, friends, or family members of the user 4 for whom the user 4 has email addresses. In some embodiments, the other users are acquaintances, friends, or family members of the user 4 for whom the user 4 has user information that allows the user 4 to use a game service to contact the other users.

In several embodiments, the group attribute data 133 includes a social graph 106, which includes relationships between the friends and the user 4 within a social network. For example, a social graph indicates whether a user is a social network friend of another user. As another example, a social graph includes a user profile 1 of friend 1, a user profile 2 of friend 2, and a user profile 3 of friend 3, and further includes associations of the profiles with a user profile of the user 4.

In a number of embodiments, a user profile of a user includes information identifying the user, e.g., a name of the user, a gender of the user, an age of the user, a gender of the user, a relationship status of the user, interests of the user, hobbies of the user, likes of the user, dislikes of the user, or a combination thereof.

The group data 135 includes the group attribute data 133, such as, for example demographic data. The group attribute data 133 is associated with one or more of the friends of the user 4. Examples of group attribute data 133 include an age of a friend, a gender of a friend, a relationship status of a friend, interests of a friend, hobbies of a friend, likes of a friend, dislikes of a friend, or a combination thereof.

In several embodiments, the group attribute data 133 is unrelated to a game that friends play. For example, the group attribute data 133 includes movies that are liked or disliked by a friend, geographical locations that are liked or disliked by the friend, real world sports that are liked or disliked by the friend, etc.

The group data 135 also includes group behavior data 137, which is associated with a game that is played by the group of friends. The group behavior data 137 includes a use profile 104 of the user 4 and use profiles 130 of the friends of the user 4. To illustrate, a use profile of a user for a game includes data regarding use of the game by the user. Examples of data regarding use of a game include a number of gaming sessions the game is played by the user during a time period, an amount of time during each gaming session the game is played by the user for a number of gaming sessions during the time period, a number of downloads of the game by the user during the time period after the user logs into his/her user account, a number of times a preview of the game is viewed by the user during the time period after the user logs into the user account, a number of times the game is indicated as being liked by the user within the user account during the time period, a number of times the game is indicated as being disliked by the user within the user account during the time period, a number of times a mention of the game is posted within the user account, and/or whether the user paid to play the game after the user logged into user account. In a number of embodiments, a use profile is created when a user uses, e.g., plays, indicates like, indicates dislike, downloads, watches a preview of, etc. of a game via a user account of the user.

It should be noted that a mention of a game is a positive mention of the game. For example, a mention of a game includes a statement in which advantages of the game are stated. In various embodiments, a user mentions a game within a post, during a chat, or a combination thereof. A chat, as used herein, refers to an online chat.

In some embodiments, a game is previewed when after accessing a portion a game at a client device, a GPU of a client device renders a portion of game data to display the portion of the game. In several embodiments, a user indicates a game as being liked or disliked by logging into a web account of the user and selecting an icon that is displayed within a service, such as a social network service, a gaming service, or an email service.

In several embodiments, a gaming session starts when a user starts playing, such as, for example, interacting with, a game after logging into a service, such as, for example, a game service, an email service, or a social network service. As an example, a user starts playing a game when the user starts to interact with the game. Also, the gaming session ends when a user stops playing a game or when the user logs out of a service. A user stops playing a game when the user stops interacting with the game. A social network service is provided via the social network 133 and a game service is provided via the game provider network 102.

In several embodiments, a game service is displayed at a client device when one or more servers execute a game application. A server may be a physical server or a virtual machine. An application includes a computer program. One or more servers execute a game application to generate game data. In various embodiments, a social network service is displayed at a client device when one or more servers execute a social network application. Users use a social network service to chat online with other users, to share posts with web accounts of other users, to post multimedia to one or more web accounts, or a combination thereof. In some embodiments, an email service is displayed at a client device that is operated by a user to send and receive emails from other users.

To log into a user account, a user provides user information, such as, for example a user name, a password, a telephone number, an answer to a security question, user identifying information, or a combination thereof, to a client device that is operated by the user, and a network interface controller (NIC) of the client device sends the user information to a server system via a network 136. Examples of a NIC include a network interface card and a network adapter. Examples of the network 136 include a wide area network (WAN), a local area network (LAN), or a combination thereof. To illustrate, the network 136 is the Internet, an Intranet, or a combination thereof. A WAN includes a wireless WAN, a wired WAN, or a combination thereof. Similarly, a LAN includes a wireless LAN, a wired LAN, or a combination thereof.

An authentication server of a server system authenticates the user information based on information that is pre-stored within the authentication server. For example, the authentication server determines that the user information is authentic when there is a match between the user information and the pre-stored information. Otherwise, the authentication server determines that the user information is unauthentic. When the authentication server determines that the user information is authentic, a user who provided the user information logs into a user account that is assigned to the user.

In several embodiments, a user account is assigned to a user when the pre-stored information is received from the user with an indication that the user is not a bot. In various embodiments, the server system includes the game provider network 102 and/or the social network 134. In some embodiments, the game provider network 102 includes one or more servers that are coupled with each other. Similarly, in a number of embodiments, the social network 134 includes one or more servers that are coupled with each other. As used herein, a server includes a virtual machine or a physical machine that includes one or more processors, one or more memory devices, and one or more NICs. A processor, as used herein, includes a central processing unit (CPU), a microprocessor, an application specific integrated circuit (ASIC), or a programmable logic device (PLD).

A logic engine 139 receives the group data 135 and game data, such as, for example, the first game data, the second game data, and the third game data, and processes the group data 135 and the game data to generate recommendation data 141. As an example, the logic engine 139 uses the group data 135 to determine the first game, e.g., game 1, a game 145, etc., among the first, second, and third games for recommendation by the user 4 to a target friend, e.g., friend 1. To illustrate, the logic engine 139 determines that the first game is played less frequently by the target friend of the user 4 than each of the second and third games, the first game is played for a shorter time by the target friend than each of the second and third games during each gaming session for a pre-determined number of gaming sessions, a preview of the first game is watched less often by the target friend than previews of each of the second and third games, the first game is downloaded for a lower number of times by the target friend than a number of times each of the second and third games are downloaded by the target friend, or a combination thereof. In this example, the logic engine 139 determines that the user 4 recommend the first game to the target friend instead of the second and third games.

As another example, the logic engine 139 determines that the first game is played by a group of users that are of a same or similar age, same or similar relationship status, same or similar interests, same or similar hobbies, same or similar likes, same or similar dislikes, or a combination thereof, as that of the target friend. In this example, the logic engine 139 determines that each of the second and third games is played by a group of users that are of a different age, different relationship status, different interests, different hobbies, different likes, different dislikes, or a combination thereof, compared to that of the target friend to whom the first game is to be recommended for play. In this example, the logic engine 139 determines that the user 4 recommend the first game to the target friend compared to the second and third games.

As still another example, the logic engine 139 determines that the first game is played by a group of users that are of a same or similar age, same or similar relationship status, same or similar interests, same or similar hobbies, same or similar likes, same or similar dislikes, or a combination thereof, as that of the target friend to whom the first game is to be suggested for play. In this example, the logic engine 139 further determines that the each of the second and third game is played less frequently, previewed for a lesser number of times, downloaded for a lower number of times, played for a lesser amount of time during each gaming session, indicated as liked for a lower number of times, indicated as disliked for a higher number of times, or a combination thereof, by the group of users compared to the first game. In this example, the logic engine 139 determines that the user 4 recommend the first game to the target friend compared to the second and third games.

As an example, two users have a similar parameter when values of the parameter are within a threshold. To illustrate, two users have a similar age when a first of the two users has an age between 12 and 24 and a second of the two users has an age between 12 and 24. As another example, two users have a similar parameter when sub-categories of the parameter are different and the sub-categories fall within one category. To illustrate, two users have a similar hobby when a first of the two users lists golf as a hobby and a second of the two users lists cricket as a sport in their web accounts that are used to access a social network service. Both cricket and golf are outdoor real world sports. As another illustration, two users have a similar like when a first of the two users lists Jackie Chan as his/her favorite actor and a second of the two users lists Jet Li as his/her favorite actor. Both Jackie Chan and Jet Li act in martial arts movies. Other examples of a parameter include gender, relationship status, interest, like, and dislike.

In several embodiments, the logic engine 139 is part of the game provider network 102. The game provider network 102 includes a user account 132 of the user 4, the use profiles 130 of friends of the user 4, user accounts 148 of the friends, the first game data, the second game data, the third game data, and the use profile 104 of the user 4. The use profiles 104 and 130 are parts of group behavior data 137.

In several embodiments, the user accounts 148 and 132 are web accounts within the social network 134 rather than accounts within the game provider network 102. In a number of embodiments, the user accounts 132 and 148 are located within one network, e.g., the game provider network 102 or the social network 134.

The recommendation data 141 is sent via a network 136 to a client device $150_4$ that is operated by the user 4. A processor, e.g., a graphical processing unit (GPU), of the client device $150_4$ processes the recommendation data 141 to display a recommendation 108 of the game 145 on a display screen of the client device $150_4$ to recommend to the target friend. Examples of a display screen include a liquid crystal display (LCD) display screen, a light emitting diode (LED) display screen, a cathode ray tube (CRT) display screen, and a plasma display screen.

In several embodiments, the recommendation 108 includes social contexts of users based on whom the game 145 is identified within the recommendation 108. Examples of a social context include an identification of an entity that offers a social network service to one or more users. Examples of identification of an entity include a name of the entity, a logo of the entity, or a combination thereof. Examples of an entity include a corporation and a partnership.

In various embodiments, the recommendation 108 includes an offer incentive 110 for the user 4. The offer incentive 110 provides an incentive to the user 4 to recommend the game 145 to the target friend. For example, the offer incentive 110 includes a message that a reward mentioned, e.g., described, identified, etc. within the offer incentive 110 will be provided to the user 4 when the user 4 shares the game 145 with the target friend. In a number of embodiments, the user 4 shares a game with another user when the user 4 selects a share button that is displayed on the client device $150_4$ via a web account of the user 4. In several embodiments, the user 4 shares a game with another user when the user 4 sends an email recommending the game 145 to the target friend.

Examples of a reward include virtual items that are related to a game, e.g., a game 152 that the user 4 plays, any other game, etc. In various embodiments, virtual items include collectibles and virtual currencies, such as, for example, virtual coins. A virtual item that is not a virtual currency is a collectible. For example, virtual wood, virtual stars, game level, energy level, points, credits, virtual food, and virtual crops are collectibles. In a number of embodiments, a reward includes virtual items, a discount for playing a game, a discount for obtaining items during play of a game, free play of a game, free items during play of a game, or a combination thereof. In various embodiments, the game 145 is the same as the game 152.

The recommendation 108 indicates to the user 4 that the user 4 will receive a reward mentioned in the offer incentive 110 after the user 4 recommends the game 145 to the target friend. The recommendation 108 also includes the user information identifying the target friend. For example, the recommendation 108 includes a user name of the target friend, an image of the target friend, or a combination thereof. In various embodiments, the recommendation 108 includes a message to the user 4 that the user 4 should suggest the game 145 to the target friend. In these embodiments, the recommendation 108 excludes the offer incentive 110. In a number of embodiments, the recommendation 108 includes a social context of the target friend. For example, the recommendation 108 includes a social network service that is accessed by the target friend to play a game that is provided by the game provider network 108.

The user 4 uses an input device of the client device $150_4$ to select a button, e.g., a send recommendation button, displayed on the display screen of the client device $150_4$. Examples of an input device include a keyboard, a mouse, a stylus, and a touchscreen. The send recommendation button is selected to recommend the game 145 to the target friend. In various embodiments, instead of a button selection, an interface selection, a menu selection, etc. is provided. Upon receiving an indication of a selection of the send recommendation button, a NIC of the client device $150_4$ sends the indication via the network 136 to the game provider network 102. Upon receiving the indication of the selection of the send recommendation button and upon determining that the target friend is logged on to his/her user account, the game provider network 102 generates and sends offer promotion data 151 via the network 136 to a client device $150_1$ that is operated by the target friend. The offer promotion data 151 includes an identity of the game 145 within a suggestion of the game 145 for play by the target friend. Other two client devices $150_2$ and $150_2$ are operated by the friends 2 and 3.

A GPU of the client device $150_1$ processes the offer promotion data 151 to display an offer promotion 140 on a display screen of the client device $150_1$. The offer promotion 140 includes a suggestion of the game 145 for the target friend. The offer promotion data 151 is stored within a user account of the target friend.

In various embodiments, the offer promotion 140 includes an incentive for the target friend to play the game 145. For example, the offer promotion 140 indicates to the target friend that the target friend will receive a discount for playing the game 145, will play the game 145 for free for a number of times, will receive a discount for play another game for playing the game 145, will play the other game for free for a number of times for playing the game 145, will receive virtual items for free during play of the game 145, will receive virtual items for free during play of the other game for playing the game 145, or a combination thereof. In a number of embodiments, the offer promotion 140 includes social contexts of users based on whom the game 145 is identified within the offer promotion 140.

When the target friend accesses the game 145 from the game provider network 102 via the network 136, a NIC of the client device $150_1$ sends an indication of the access via the network 136 to the game provider network 136. Upon receiving the indication of the access, the game provider network 136 generates and sends discount data, virtual item data, or any other data as reward data to fulfill the offer promotion 140 to the client device $150_1$ via the network 136. The reward data is rendered by the GPU of the client device $150_1$ to display a reward for the target friend for accessing the game 145 via an input device of the client device $150_1$. The target friend can access the reward, e.g., a virtual item, a discounted game play, free game play, by selecting or hovering over the reward.

In a number of embodiments, when the target friend accesses the game 145 from the game provider network 102, the game provider network 102 generates and sends a reward to the client device $150_4$ via the network 136. The game provider network 102 generates and sends the reward to the client device $150_4$ when the user 4 accesses the user account 132.

It should be noted that each of a module and an engine, as used herein, includes a hardware, a software, or a combination thereof. For example, a module or an engine includes a computer program that is executed by one or more processors. As another example, a module or an engine includes an ASIC or a PLD that performs the operations described herein as performed by the module. As yet another example, a module or an engine includes one or more processors and one or more memory devices that store a computer program that is executed by the one or more processors.

Moreover, it should be noted that although three user profiles and use profiles of three friends of the user 4 are described, in a number of embodiments, a number of user profiles and use profiles of any number of users can be used. Also, it should be noted that in various embodiments, the operations, e.g., generation, etc., other than communication operations, described above as being performed by a network, e.g., the game provider network 102, the social network 134, etc., are performed by one or more processors of one or more servers of the network. In these embodiments, the communication operations, e.g., sending, receiving, etc., are performed by one or more NICs of one or more servers of the network.

In several embodiments, each user account is within a different network and each network is of a different type. For example, a network that includes the user account 130 is a social network, a network that includes a user account of the target friend is a game provider network, and a network that includes a user account of the friend 2 is an email network.

In various embodiments, two or more of the networks in which the user accounts 132 and 148 are located are of the same type and are networks that are controlled by different entities. For example, a network that includes the user account 132 is a social network that is controlled by a first entity and a network that includes a user account of the target friend is a social network that is controlled by a second entity, which is other than the first entity.

In some embodiments, a user account of a user is located within a network that is controlled by a different entity than that controlling a user account of another user. Moreover, in these embodiments, the user accounts are of the same type. For example, a network that includes the user account 132 of the user 4 is a game provider network that is controlled by an entity that develops games and a network that includes a user account of the target friend is a game provider network that is controlled by another entity that develops games.

In several embodiments, the game provider network 102 and the social network 134 are controlled by the same entity. For example, all servers of the game provider network 102 and the social network 134 are controlled by an entity that develops games. In a number of embodiments, servers of the game provider network 102 are controlled by an entity that is other than an entity that controls the servers of the social network 134. For example, a server of the game provider network 102 is controlled by an entity that develops games and a server of the social network 134 is controlled by an entity that develops a social network service. In various embodiments, an entity controls a server when the entity leases or owns server to use the server for executing a computer program.

In some embodiments, a user account of a user is located within a network that is controlled by a different entity than that controlling a user account of another user. Moreover, in these embodiments, the user accounts are of different types. For example, a network that includes the user account 132 is a social network and a network that includes a user account of the target friend is a game provider network and the social network is controlled by a different entity than that controlling the game provider network. In these embodiments, the entity controlling the social network develops the social network and the entity controlling the game provider network develops games.

In a number of embodiments, a game provider network is formed when one or more processors of one or more servers execute a game application to provide a game service at one or more client devices. The game service is accessed by a user via a user account, e.g., a game service account, to play a game.

In a number of embodiments, a user profile, a user account, or a use profile is stored within one or more memory devices of a network. For example, the user profiles of the users 1, 2, 3, and 4 are stored in one or more memory devices of the social network 134. As another example, the use profiles 130 and 104 of the users 1 thru 4 are stored in one or more memory devices of the game provider network 102. As yet another example, the user accounts 148 and 132 are stored in one or more memory devices of the game provider network 102.

The group data 135 is stored in one or more memory devices. For example, the group attribute data 133 is stored in one or more memory devices and the group behavior data 137 is stored in one or more memory devices.

Figure 2:
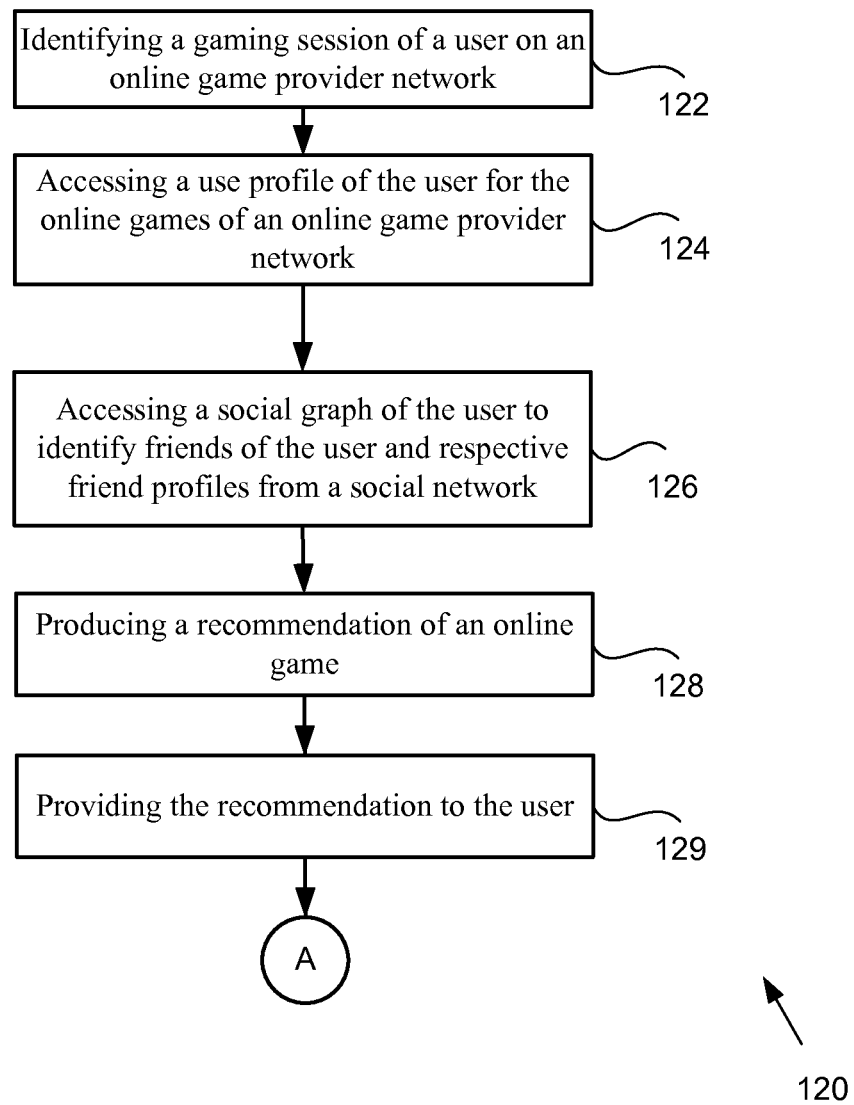
FIG. 2 is a flowchart of a method for determining a game to suggest to user for recommending to a target friend based on group data, in accordance with an embodiment described in the present disclosure.

FIG. 2 is a flowchart of an embodiment of a method 120 for determining a game to suggest to the user 4 for recommending to the target friend based on the group data 135 (FIG. 1). The method 120 is executed by one or more processors of one or more servers of a server system, e.g., the game provider network 102, the social network 134, or a combination thereof.

In an operation 122, a gaming session of the user 4 (FIG. 1) on the game provider network 102 (FIG. 2) is identified. For example, a processor of the game provider network 102 determines that the user 4 is engaged in a gaming session. As another example, a processor of the game provider network 102 determines that the user 4 logged into the user account 132 (FIG. 1) and is playing a game, e.g., game 152 (FIG. 1). In several embodiments, the game 152 is played by accessing game data from the game provider network 102.

In an operation 124, the use profile 104 of the user 4 regarding play of one or more games is accessed, e.g., read, from a memory device of the game provider network 102. For example, data regarding usage of the online first, second, and third games by the user 4 via the user account 132 is read. In this example, the user account 132 logged into by the user 4 to access the online games. In a number of embodiments, the game 152 is an example of the second game.

Moreover, in an operation 126, the social graph 106 of the user 4 that is received from the social network 134 via the network 136 by the game provider network 102 is accessed from a memory device of the game provider network 102. A NIC of the social network 134 sends the social graph 106 via the network 136 to a NIC of the game provider network 102. The user profile of the user 4 is accessed to determine the user profiles 1, 2, and 3 of the friends. For example, from the user profile of the user 4, friends of the user 4 are determined and user profiles 1, 2, and 3 of the friends 1, 2, and 3 are accessed from a memory device of the game provider network 102.

In an operation 128, the recommendation data 141 is generated from the user profile and use profile of the user 4 and the user profiles and use profiles of the friends 1, 2, and 3. For example, the recommendation data 141 is generated from the group data 135 (FIG. 1). The recommendation data 141 includes an identification of the game 145 (FIG. 1) and/or data regarding the offer incentive 110 (FIG. 1) for the user 4.

The recommendation data 141 is generated based on data regarding the friends of the user 4, data regarding the user 4, data regarding use of the game 145 by the target friend, data regarding use of the game 145 by the friends 2, 3 and 4, data regarding use of games other than game 145 by the target friend, data regarding use of games other than game 145 by the friends 2, 3 and 4, or a combination thereof. To illustrate, if the target friend has the same or similar age, the same or similar gender, the same or similar relationship status, the same or similar interests, the same or similar hobbies, the same or similar likes, the same or similar dislikes, or a combination thereof, as that of the friends 2, 3 and 4, the game 145, which is played by the friends 2, 3 and 4, is identified to the user 4 at the client device $150_4$.

As another illustration, if each user 2, 3, or 4:
(a) plays the game 145 for a higher number of gaming sessions than a number of gaming sessions for which the other games are played by the user at a corresponding one of the client devices 150, or
(b) plays the game 145 for a longer time than an amount of time for which the other games are played by the user during each gaming session for a pre-determined number of gaming sessions, or
(c) watches previews of the game 145 more often than previews of the other games are watched by the user, or
(d) has indicated the game 145 as being liked for a higher number of times than a number of times for which the other games are indicated as being liked by the user,
(e) has indicated the game 145 as being disliked for a lower number of times than a number of times for which the other games are indicated as being disliked by the user, or
(f) has accessed the game 145 to a corresponding one of the client devices 150 operated by the user for a higher number of times than a number of times the other games are accessed to the client device, or
(g) has mentioned the game 145 within a corresponding web account of the user for a higher number of times than mentioning the other games within the web account, or
(h) paid to play the game 145 after the user logs into his/her corresponding web account, or
(i) paid a higher amount to play the game 145 compared to the other games, or
(j) a combination thereof,
the game 145 is identified to the user 4 within the recommendation 108 at the client device $150_4$. It should be noted that a client device corresponds to a user when the user operates the client device to access a web account of the user.

As yet another illustration, if each user 2, 3, or 4:
(a) plays the game 145 for a higher number of gaming sessions than a number of gaming sessions for which the game 145 is played by the target friend at the client device $150_1$, or
(b) plays the game 145 for a longer time than an amount of time for which the game 145 is played by the target friend at the client device $150_1$ during each gaming session for a pre-determined number of gaming sessions, or (c) watches previews of the game 145 more often than previews of the game 145 are watched by the target friend, or
(d) has indicated the game 145 as being liked for a higher number of times than a number of times for which the game 145 is indicated as being liked by the target friend, or
(e) has indicated the game 145 as being disliked for a lower number of times than a number of times for which the game 145 is indicated as being disliked by the target friend, or
(f) has downloaded the game 145 to a corresponding one of the client devices $150_2$, $150_3$, and $150_4$ for a higher number of times than a number of times the game 145 is downloaded to the client device $150_1$ by the target friend, or
(g) has mentioned the game 145 within their web accounts for a higher number of times than a number of times for which the game 145 is mentioned within the web account of the target friend, or
(h) a combination thereof,
the game 145 is identified within the recommendation 108 to the user 4 at the client device $150_4$.

As another illustration, if each user 2, 3, or 4:
(a) has the same or similar age as that of the target friend, or
(b) has the same or similar gender as that of the target friend, or
(c) has the same or similar relationship status as that of the target friend, or
(d) has the same or similar interests as that of the target friend, or
(e) has the same or similar hobbies as that of the target friend, or
(f) has the same or similar likes as that of the target friend, or
(g) has the same or similar dislikes as that of the target friend, or
(h) plays the game 145 for a higher number of gaming sessions than a number of gaming sessions for which other games are played by the corresponding user 2, 3, or 4 at a corresponding one of the client devices $150_2$, $150_3$, and $150_4$, or
(i) plays the game 145 for a longer time than an amount of time for which the other games are played by the corresponding user 2, 3, or 4 during each gaming session for a pre-determined number of gaming sessions, or
(j) watches previews of the game 145 more often than previews of the other games are watched by the corresponding user 2, 3, or 4, or
(k) has indicated the game 145 as being liked for a higher number of times than a number of times for which the other games are indicated as being liked by the corresponding user 2, 3, or 4, or
(l) has indicated the game 145 as being disliked for a lower number of times than a number of times for which the other games are indicated as being disliked by the corresponding user 2, 3, or 4, or
(m) has downloaded the game 145 to a corresponding one of the client devices $150_2$, $150_3$, and $150_4$ for a higher number of times than a number of times the other games are downloaded to the corresponding one of the client devices $150_2$, $150_3$, and $150_4$, or
(n) has mentioned the game 145 within a corresponding web account for a higher number of times than mentioning the other games within the corresponding web account, or
(o) paid to play the game 145 after logging into a corresponding web account, or
(p) paid a higher amount to play the game 145 compared to the other games, or
(q) plays the game 145 for a higher number of gaming sessions than a number of gaming sessions for which the game 145 is played by the target friend at the client device $150_1$, or
(r) plays the game 145 for a longer time than an amount of time for which the game 145 is played by the target friend at the client device $150_1$ during each gaming session for a pre-determined number of gaming sessions, or
(s) watches previews of the game 145 more often than previews of the game 145 are watched by the target friend, or
(t) has indicated the game 145 as being liked for a higher number of times than a number of times for which the game 145 is indicated as being liked by the target friend, or
(u) has indicated the game 145 as being disliked for a lower number of times than a number of times for which the game 145 is indicated as being disliked by the target friend, or
(v) has downloaded the game 145 to the corresponding one of the client devices $150_2$, $150_3$, and $150_4$ for a higher number of times than a number of times the game 145 is downloaded to the client device $150_1$ by the target friend, or
(w) has mentioned the game 145 within the corresponding web account for a higher number of times than a number of times for which the game 145 is mentioned within a web account of the user 1 by the user 1, or
(x) a combination thereof,
the game 145 is identified within the recommendation 108 to the user 4 at the client device $150_4$.

In various embodiments, in the preceding illustration, instead of a number of times, an average of a number of times is used. For example, instead of determining whether the game 145 is played for a longer time than an amount of time for which the other games are played by each user 2, 3, and 4 during each gaming session for a pre-determined number of gaming sessions, it is determined whether an average amount of time for which each user 2, 3, and 4 plays the game 145 for the pre-determined number of gaming sessions is longer than an average amount of time for which the other games are played by the user for the pre-determined number of gaming sessions. As another example, instead of determining whether each user 2, 3, and 4 has indicated the game 145 as being liked for a higher number of times than a number of times for which the other games are indicated as being liked by the user, the number of times for which each user 2, 3, and 4 has indicated the game 145 as being liked is averaged over a period of time to generate a first average and the number of times for which each user 2, 3, and 4 has indicated the other games as being liked is averaged over the time period to generate a second average, and it is determined whether the first average is greater than the second average.

Also, in some embodiments, in the preceding illustration, instead of the combination, a weighted combination is used. For example, whether each user 2, 3, and 4 paid to play the game 145 after the user logged into a corresponding web account of the user is assigned a higher weight than a weight assigned to whether each user 2, 3, and 4 has mentioned the game 145 within the corresponding web account of the user for a higher number of times than mentioning the other games within the corresponding web account. As another example, a factor of whether each user 2, 3, and 4 has indicated the game 145 as being disliked for a lower number of times than a number of times for which the other games are indicated as being disliked by the user is assigned a higher weight than a weight assigned to a factor of whether the user plays the game 145 for a longer time than an amount of time for which the game 145 is played by the target friend at the client device $150_1$ during each gaming session for a pre-determined number of gaming sessions.

In various embodiments, in the preceding illustration, instead of or in addition to the determination that each user 2, 3, and 4 plays the game 145 for a longer time than an amount of time for which the other games are played by the user during each gaming session for a pre-determined number of gaming sessions, it is determined that a virtual item within the game 145 has a higher magnitude than a virtual within each of the other games. For example, it is determined whether an energy level within the game 145 is higher than an energy level within each of the second and third games. As another example, it is determined whether a number of virtual coins or virtual points accumulated during a play of the game 145 is greater than a number of virtual points or virtual coins within a play of each of the second and third games.

When the user 4 uses the client device $150_4$ to log into his/her web account to play a game, such as, for example, the game 152, in an operation 129, a NIC of the game provider network 102 sends the recommendation data 141 to the NIC of the client device $150_4$. The GPU of the client device $150_4$ renders the recommendation data 141 to display the recommendation 108 that indicates to the user 4 that the user 4 recommend the game 145 to the target friend. For example, the recommendation 108 includes information identifying the target friend and the game 145. The user 4 sees the recommendation 108 and a message indicating that the user 145 recommend the game 145 to the target friend. In various embodiments, the recommendation includes the offer incentive 110 (FIG. 1) that mentions a reward and the reward is provided to the user 4 by the game provider network 102 when the user 4 recommends the game 145 to the target friend. The user 4 decides to recommend the game 145 to the target friend.

Figure 3:
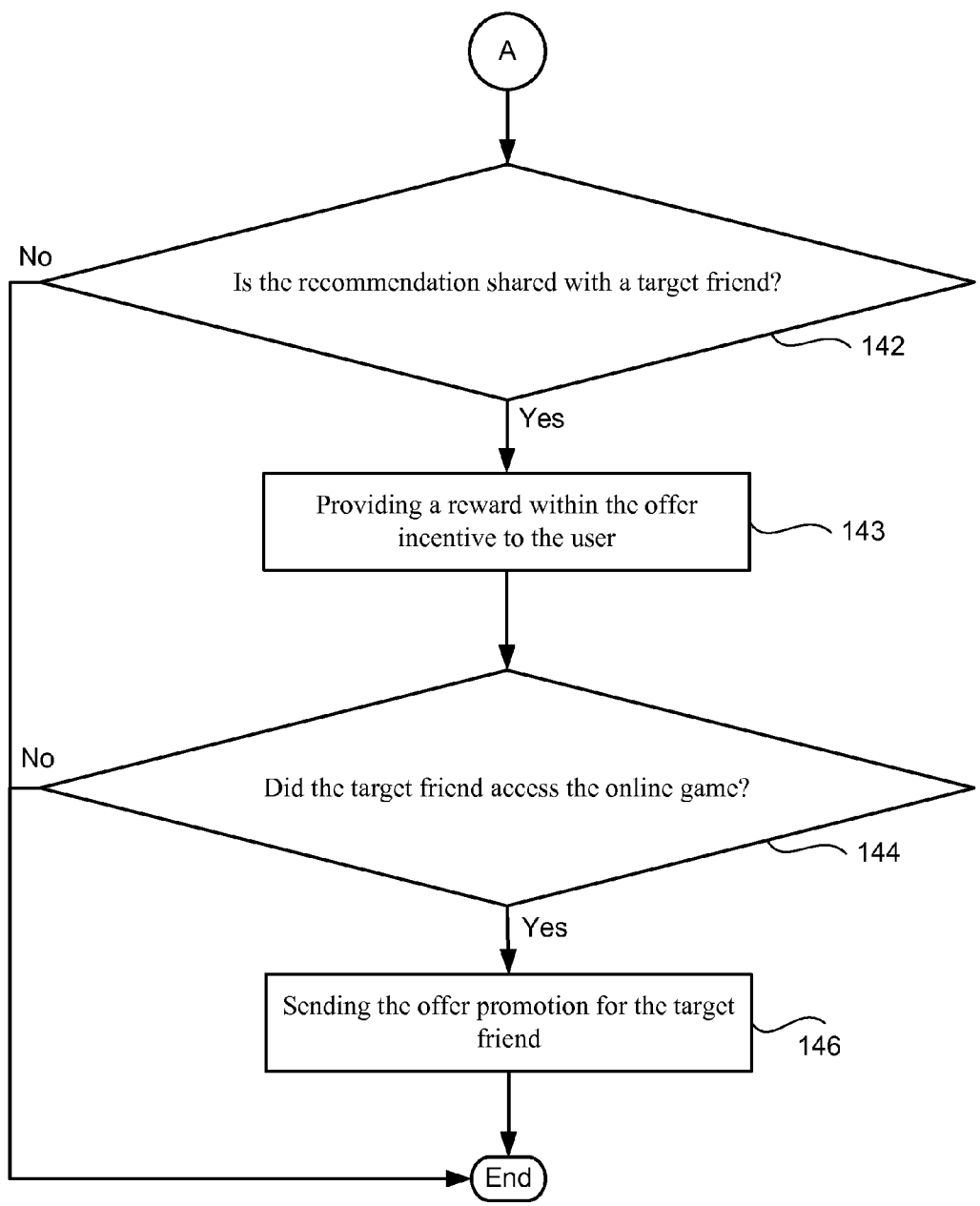
FIG. 3 is a continuation of the flowchart of the method of FIG. 2, in accordance with an embodiment of the present disclosure.

FIG. 3 is a flowchart of the method 120. In an operation 142, it is determined whether a suggestion of the game 145 is shared with the target friend. For example, it is determined whether an indication of a selection of a button, e.g., a share button, a like button, etc., is received from the client device $150_4$ to share an identity of the game 145 with the target friend. In this example, the user 4 is logged into the user account 132. In response to receiving the indication of the selection of the button, it is determined that the user 4 wishes to share the identity of the game 145 with the target friend. On the other hand, in response to determining that the indication of the selection is not received, it is determined that the user 4 does not wish to share the identity of the game 145 with the target friend.

As another example, it is determined whether an indication that a suggestion of the game 145 is sent to a user account of the target friend is received. For example, when an indication of a selection of a button, e.g., a share button, a like button, etc., is received from the client device $150_4$, an identity of the game 145 is sent to a user account of the target friend. In this example, the user 4 is logged into the user account 132. Also, in this example, it is determined that a suggestion of the game 145 is sent to the user account of the target friend.

As another example, it is determined whether an indication of a selection of a button, e.g., a share button, a like button, etc., that allows the user 4 to share an identity of the game 145 is received from the client device $150_4$ via the network 136. In this example, the user 4 is logged into the user account 132. In response to determining that the indication of the selection of the button is received, menu data is generated and sent to the client device $150_4$. The menu data is processed to render a menu on the display screen of the client device $150_4$. The menu prompts the user 4 whether the user 4 wishes to share the identity with the target friend or also with other friends 2 and 3 of the user 4. The user 4 identifies via the input device of the client device $150_4$ friends with whom the user 4 wishes to share the identity of the game 145. In response to receiving an indication of the selection of the button, it is determined that the user 4 wishes to share the identity of the game 145 with the friends that the user 4 has identified. On the other hand, in response to determining that the identification of any friends is not received, it is determined that the user 4 does not wish to share the identity of the game 145 with any friends of the user 4.

Upon determining that the user 4 does not wish to share a suggestion of the game 145 with the target friend, the method 120 ends. On the other hand, in response to determining that the user 4 wishes to share a suggestion of the game 145 with the target friend, in an operation 143, a reward mentioned within the offer incentive 110 is provided to the user 4. For example, when it is determined that an indication of a selection of a button, e.g., a share button, a like button, etc., is received from the user 4 via the input device of the client device $150_4$ to indicate that the user 4 wishes to suggest the game 145 to the target friend, the user 4 is awarded virtual items for a game. The game for which the user 4 is awarded virtual items may be a game that the user 4 plays most frequently than the other games, a game that the logic engine 139 (FIG. 1) determines be recommended to the user 4 for play by the user 4 based on the use profile 104 and/or user profile of the user 4, or any other game that is offered by the game provider network 102. An example of a manner in which a game is recommended to the user 4 for play by the user 4 based on a use profile and/or a user profile of the user 4 is described in U.S. patent application Ser. No. 13/537,846. As another example, when it is determined that an indication of a selection of a button, e.g., a share button, a like button, etc., and identities of friends of the user 4 with whom the user 4 wishes to share the identity of the game 145 is received, a reward mentioned within the offer incentive 110 is provided to the user 4.

In an operation 144, it is determined whether the target friend accessed the game 145 that is shared by the user 4. For example, it is determined whether an indication of a selection of a button, e.g., a download button, a play button, to download one or more portions of the game 145 is received via an input device of the client device $150_1$. In this example, the target friend is logged into his/her user account. In response to determining that the indication of the selection of a button to access the game 145 is not received, the method 120 ends. On the other hand, in response to determining that the indication of the selection of a button to access the game 145 is received, in an operation 146, reward data, e.g., discount data, virtual item data, or any other data, to fulfill the offer promotion 140 is sent to the client device $150_1$ via the network 136. For example, the target friend receives a discount towards another game that may be accessed via the game provider network 102, receives a virtual item during play of the game 145, receives a virtual item during another game that is accessed from the game provider network 102, or a combination thereof. The method 120 ends after the operation 146.

In several embodiments, in response to determining that the indication of the selection of a button to access the game 145 is received, the game provider network 102 generates and sends incentive data via the network 136 to the client device 150₄. The incentive data is sent when the user 4 accesses the user account 132. The GPU of the client device 150₄ processes the incentive data to provide incentives to the user 4 for a game, e.g., game 145, game 152, etc. Examples of the incentives include virtual items, discount offer to play a game, free game play, game level during a game, energy level during a game, points during a game, etc.

Figure 4:
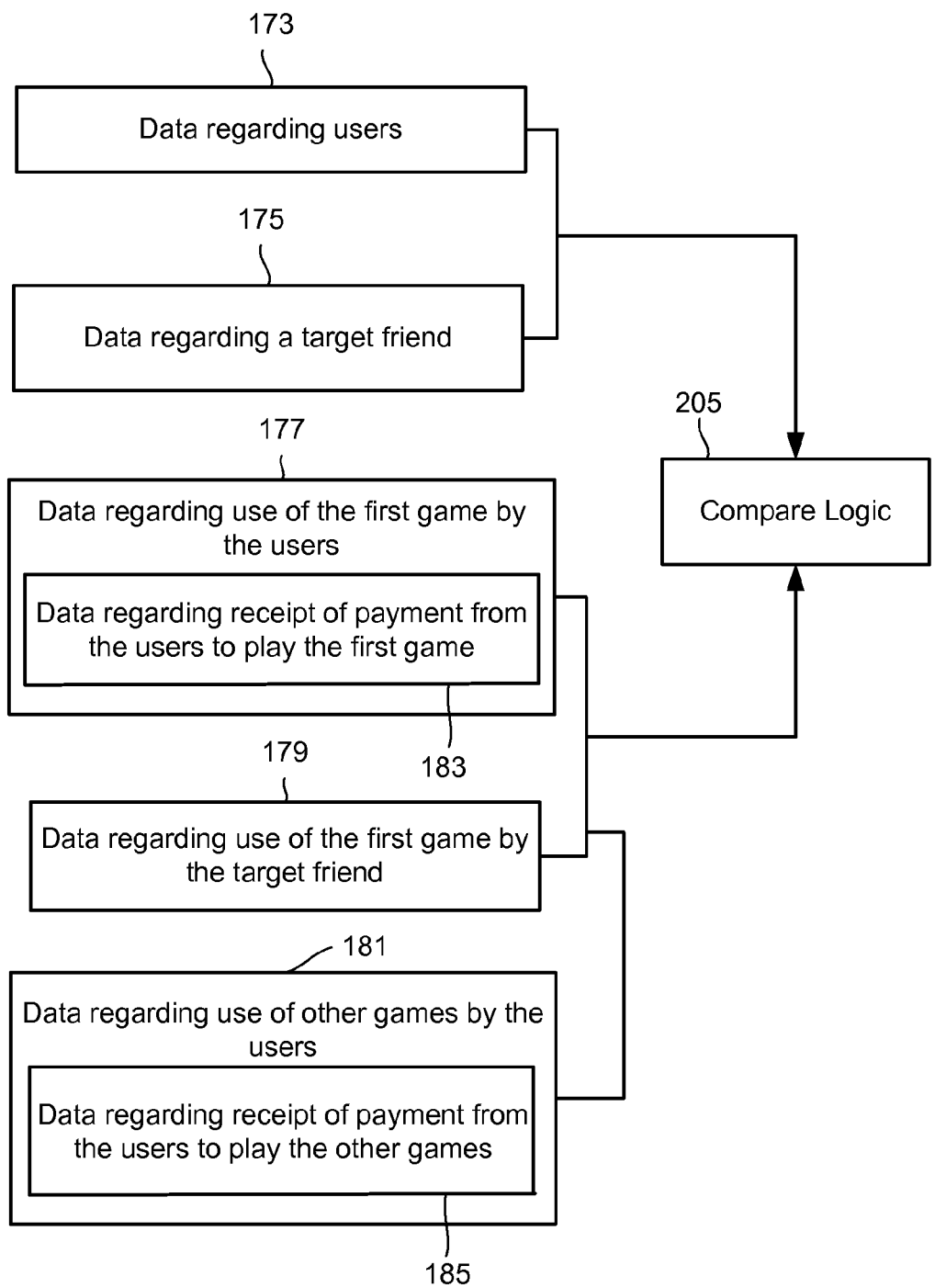
FIG. 4 is a diagram of a compare logic module that compares data received from one or more databases to determine an identity of a game that is to be suggested to the target friend, in accordance with one embodiment described in the present disclosure.

FIG. 4 is a diagram of an embodiment of a compare logic module 205 that compares data received from one or more databases to determine an identity of the game 145 (FIG. 1) that is to be suggested to the target friend. In several embodiments, the compare logic module 205 is executed by a processor of the game provider network 102 (FIG. 1).

The compare logic module 205 receives data 173 regarding the users 2 thru 4, who are friends of the target friend (FIG. 1), data 175 regarding the target friend (FIG. 1), data 177 regarding use of the game 145 by the users 2 thru 4, data 179 regarding use of the game 145 by the target friend, and/or data 181 regarding use of the other games by the users 2 thru 4. In some embodiments, the compare logic module 205 compares the data 173 regarding the users 2 thru 4 with data 175 regarding the target friend to determine whether a value of a parameter of the target friend and one or more values of the parameter of the users 2 thru 4 are the same or similar. For example, the compare logic module 205 determines whether an age of the target friend is the same or similar to that of ages of the users 2 thru 4. As another example, the compare logic module 205 determines whether likes of the target friend are the same or similar to likes of the users 2 thru 4.

Moreover, in various embodiments, the compare logic module 205 compares the data 177 regarding use of the game 145 by the users 2 thru 4 with data 179 regarding use of the game 145 by the target friend. For example, a number of gaming sessions for which the game 145 is played by the users 2 thru 4 is compared with a number of gaming sessions for which the game 145 is played by the target friend. As another example, a number of times for which the game 145 is indicated as being liked by the users 2 thru 4 is compared with a number of times for which the game 145 is indicated as being liked by the target friend.

In some embodiments, the compare logic 205 compares the data 177 regarding use of the game 145 by the users 2 thru 4 with data 181 regarding use of the other games by the users 2 thru 4. For example, a number of gaming sessions for which the game 145 is played by the users 2 thru 4 is compared with a number of gaming sessions for which each of the other games are played by the users 2 thru 4. As another example, an amount of time for which the game 145 is played by the users 2 thru 4 for a pre-determined number of gaming sessions is compared with an amount of time for which each of the other games is played by the users 2 thru 4 for the pre-determined number of gaming sessions.

The data 177 includes data 183 regarding receipt of payment from the users 2 thru 4 to play the game 145 and the data 180 includes data 185 regarding receipt of payment from the users 2 thru 4 to play the other games. For example, a processor of the gaming provider network 102 (FIG. 1) determines whether the users 2 thru 4 have paid to play the game 145 and have not paid to play other games. In various embodiments, a payment to play a game is received in the form of fiat money, credit, virtual currency, or a combination thereof. In response to determining that the users 2 thru 4 have not paid to play the other games and have paid to play the game 145, the processor determines to send an identification of the game 145 to send to the client device 150₄. On the other hand, in response to determining that the users 2 thru 4 have paid to play the other games and have not paid to play the game 145, the processor determines to send an identification of one of the other games instead of the identification of the game 145.

Figure 5:
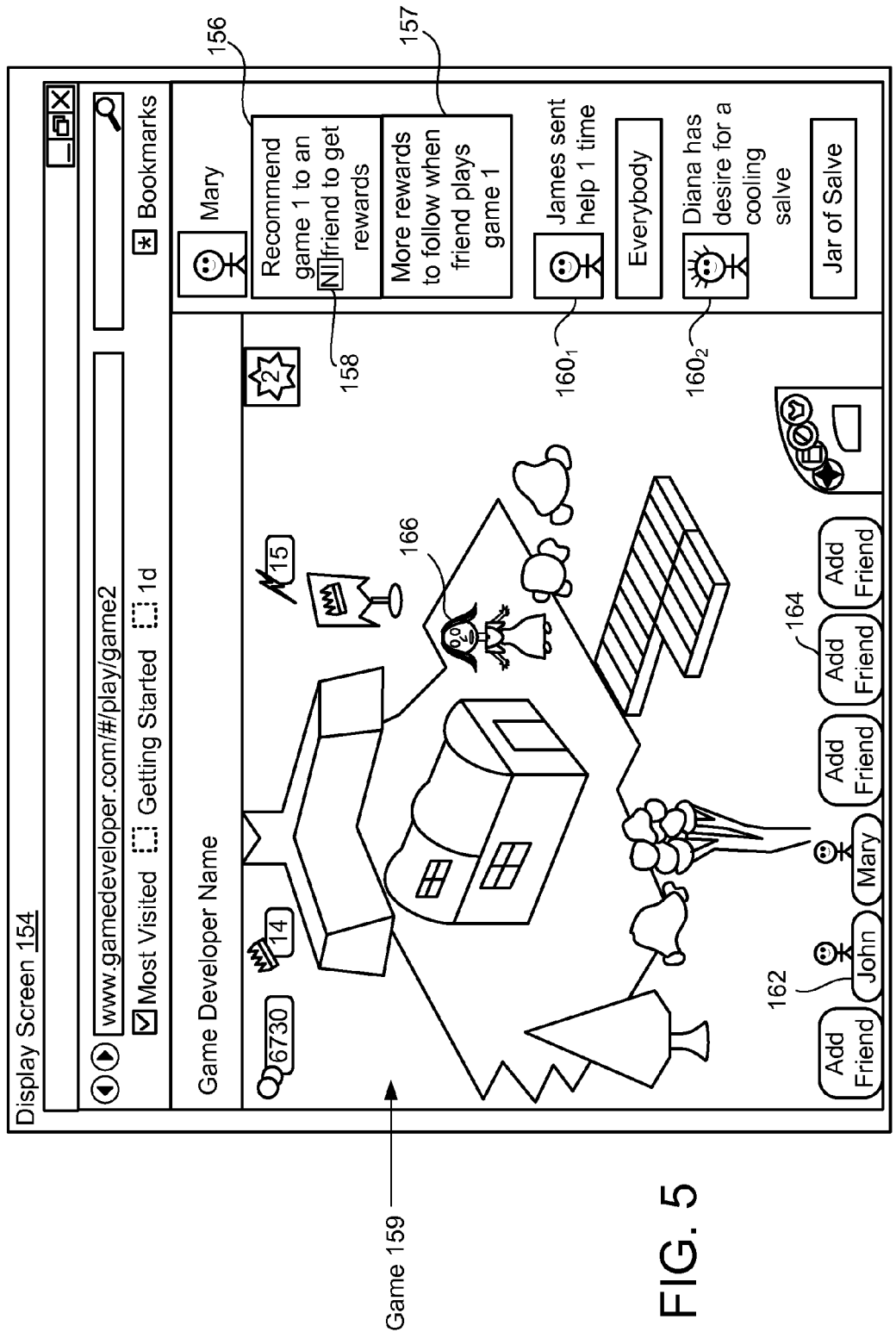
FIG. 5 is a diagram of a recommendation that is displayed besides a game played by the user, in accordance with one embodiment described in the present disclosure.

FIG. 5 is a diagram of an embodiment of a recommendation 156 that is displayed besides a game 159 played by the user 4 (FIG. 1). The game 159 is an example of the game 152 (FIG. 1). The game 159 is played on a display screen 154, which is an example of the display screen of the client device 150₄ (FIG. 1).

The user 4 logs into the user account 132 (FIG. 1) to play the game 159. For example, the user 4 accesses a web page of a game developer from a server of the game provider network 102 (FIG. 1). In this example, when the user 4 selects an identification of the game 159 on the web page via the input device of the client device 150₄, the GPU of the client device 150₄ displays a prompt on the display screen 154 to prompt the user 4 to provide the user information. When the user 4 provides the user information via the input device of the client device 150₄, an authentication server determines whether the user information is authentic. Upon receiving a determination from the authentication server that the user information is authentic, a server of the game provider network 102 provides access to the game 159 to the user 4. Examples of a game developer include an entity that develops games, described herein and an entity that owns legal rights to the games.

In several embodiments, the authentication server is separate from the game provider network 102 and the social network 134. In various embodiments, the authentication server is part of the game provider network 102 and the social network 134.

In various embodiments, instead of accessing a web page of the game developer first and then providing the use information, the user 4 first provides the user information and then accesses the web page of the game developer. For example, the user 4 requests a web page of a service provider, provides the user information to the authentication server via the web page to log into the user account 132, requests another web page of the game developer, and then selects an identification of the game 159. Upon receiving the indication of the identification of the game 159, a server of the game provider network 102 provides access to the game 159 to the user 4.

Examples of a service provider include an entity that develops a game service, a social network service, and/or an email service. Other examples of a service provider include an entity that owns legal rights to a service.

As shown in FIG. 5, upon logging into the user account 132 and accessing a webpage having a uniform resource location (URL) "www.gamedeveloper.com/#/play/game2", the user 4 plays the game 159. In several embodiments, the web page shown in FIG. 5 is one of many web pages of the game developer's website.

The game 159 has one or more objectives that the user 4 can achieve. For example, an objective of the game 159 is to build a happy virtual kingdom. As another example, an objective of the game 159 is to collect virtual coins, collect virtual crowns, collect other items, chop virtual trees, feed virtual chickens, gain virtual energy, progress through levels of the second game, or a combination thereof.

In several embodiments, when an objective of the game 159 is achieved, the user 4 is rewarded with one or more virtual items, virtual energy, a game level, or a combination thereof. Also, in some embodiments, when an objective of the game 159 is achieved, the user 4 is provided with another objective to pursue.

In various embodiments, during the play of the game 159, the user 4 may invite social network friends of the user 4 to play the game 159. For example, when the user 4 selects an image 164 within the game 159 via the input device of the client device $150_4$, the GPU of the client device $150_4$ displays a window that includes names of social network friends of the user 4. The user 4 can select one or more of the names of the social network friends to invite the one or more social network friends to play the game 159.

In various embodiments, during the play of the game 159, the user 4 selects, via the input device of the client device $150_4$, an image 162 to access a virtual gaming environment that is owned by a virtual user. For example, when the user 4 selects the image 162 of a virtual user named "John", the NIC of the game provider network 102 sends virtual kingdom data via the network 136 to the NIC of the client device $150_4$. The virtual user named "John" does not represent any real world user, such as, for example, a user named "Mary". Upon receiving the virtual kingdom data, the GPU of the client device $150_4$ displays a virtual kingdom that is owned by the virtual user "John". The user 4 can achieve various objectives within the virtual kingdom of John.

In some embodiments, the user 4 is represented by a virtual user 166 during the play of the game 159. For example, the user 4 can direct movement of the virtual user 166 to a location on the display screen 154 by selecting, via the input device of the client device $150_4$, the location on the display screen 154.

In various embodiments, during the play of the game 159, the GPU of the client device $150_4$ receives the recommendation data 141 (FIG. 1) via the network 136 (FIG. 1) from the game provider network 102 and executes a rendering program to apply the rendering program to the recommendation data 141 to display recommendations 156 and 157 on the display screen 154.

The recommendation 156 indicates that Mary recommend game 1, e.g., the game 145, to the target friend, who is associated with a network identifier (NI) 158. A network identifier identifies a social context, e.g., a social network, which is accessed by a user. For example, the target friend accesses a social network identified with the NI 158 to play a game. In a number of embodiments, the recommendation 156 includes the user information, e.g., name of the target friend, image of the target friend, etc., regarding the target friend to identify the target friend. The recommendation 157 indicates to the user 4 that the user 4 will receive additional rewards when the target user plays game 1.

When the user 4 selects the recommendation 156 via the input device of the client device $150_4$, the NIC of the game provider network 102 receives the indication of the selection. Upon receiving the indication of the selection, a processor of the game provider network 102 generates the offer promotion data 151 and the NIC of the game provider network 102 sends the offer promotion data to the client device $150_1$ (FIG. 1). The offer promotion data 151 is sent when the target friend accesses his/her user account via the network 136.

Moreover, upon receiving the indication of the selection of the recommendation 156, a processor of the game provider network 102 generates reward data and sends the reward data via the network 136 to the client device $150_4$. The reward data is sent when the user 4 accesses the user account 132 (FIG. 1) via the network 136. The GPU of the client device $150_4$ accesses the reward data from the NIC of the client device $150_4$ and processes the reward data to display a reward, which is provided to the user 4.

In various embodiments, the recommendation 156 includes an invite button. When the invite button is selected by the user 4 via the input device of the client device 4, a list of social network friends of the user 4 is displayed on the display screen 154 and the user 4 may select friends from the list to suggest the game 1.

In a number of embodiments, the recommendation 156 excludes any incentive for the user 4 to recommend the game 1 to the target friend and/or to other friends. For example, the recommendation 156 indicates to the user 4 that the user 4 recommend the game 1 to the target friend and/or to other friends.

In various embodiments, the recommendation 156 includes an NI of a social context of social network friends of the target friend and a number of the social network friends. For example, the recommendation 156 indicates to the user 4 that z number of social network friends of the target friend access a social network to play the game 145, where z is an integer greater than or equal to zero. In various embodiments, the recommendation 156 includes identities of more than one social context. For example, the recommendation 156 includes that z social network friends of the user 4 play the game 145 by using a first social network service and v number of social network friends of the user 4 play the game 145 by using a second social network service, where v is an integer greater than zero. Examples of an identity of a social context include a name of an entity that provides a social network service and a logo of the entity.

In various embodiments, a multimedia $160_1$ of a member of a social network service and a status of the member with respect to the game 159 and with respect to the user 4 are displayed with the recommendation 156. An example of a status includes that "James sent help 1 time". The help is help to the user 4 in the game 159. In these embodiments, the social network service is the same as that accessed by the user 4 by logging into a web account and that is used to play the game 159. Also, another multimedia $160_2$ of another member of the social network service and a status of the member with respect to the game 159 and with respect to the user 4 are displayed. An example of a status includes that "Dana has desire for cooling salve".

In several embodiments, any number of multimedia of any number of members of the social network service is displayed on a display screen. In various embodiments, the members $160_1$ and $160_2$ are examples of two of the users 1 thru 3.

In several embodiments, any word within the recommendation 156 is programmed to receive a selection from the user 4 via the input device of the client device $150_4$. Upon receiving an indication of the selection, the NIC of the client device $150_4$ sends the indication via the network 136 to the game provider network 102 (FIG. 1). Upon receiving the indication of the selection, the game provider network 102 generates the offer promotion data 151 (FIG. 1).

It should be noted that in various embodiments, at a time the recommendations 156 and/or 157 are displayed on the display screen 154, the user 4 is not playing or is about to play a game.

Figure 6:
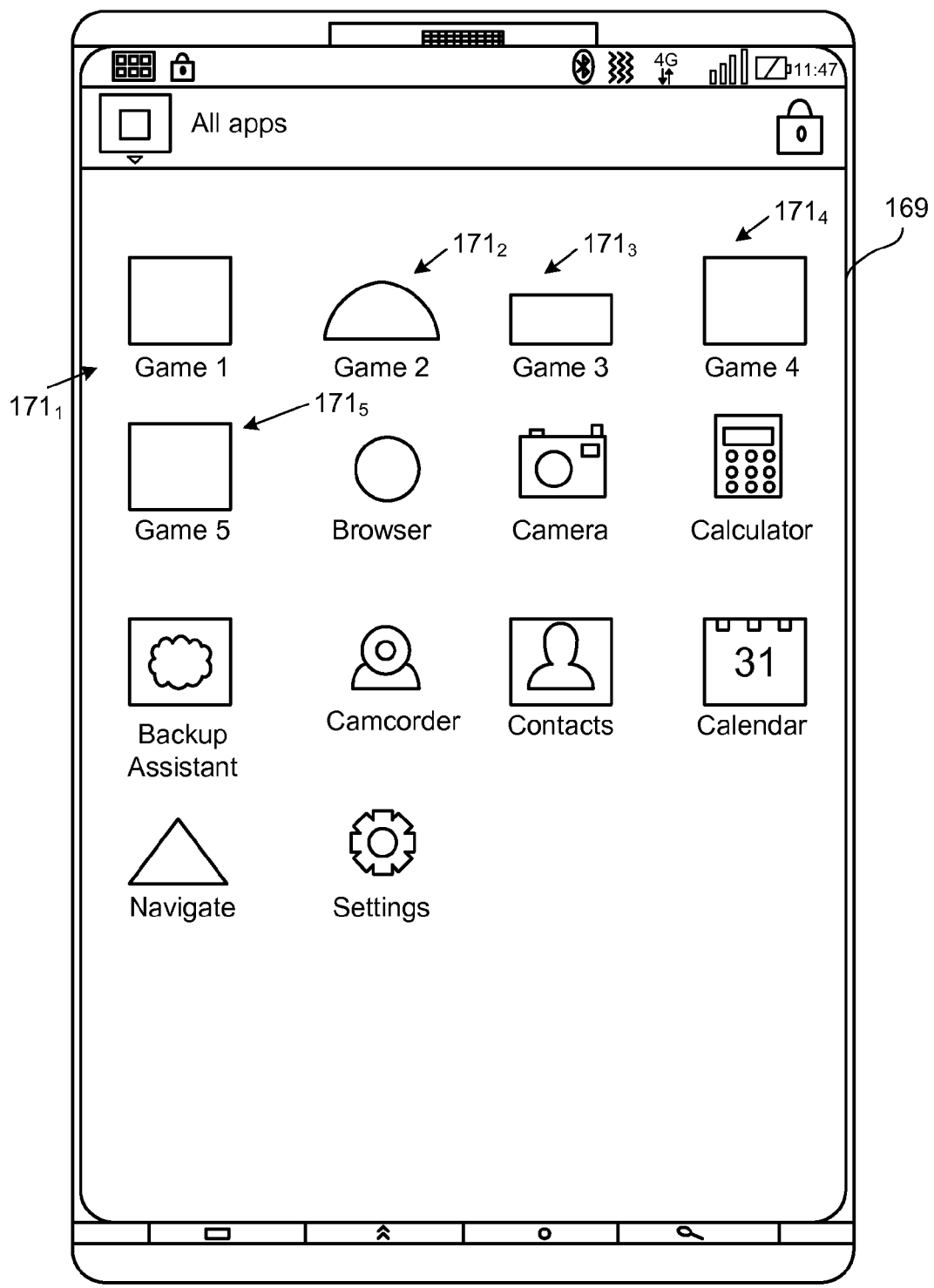
FIG. 6 is a diagram of a display screen that displays symbols of multiple mobile applications that are accessed for playing multiple games on a mobile device, in accordance with one embodiment described in the present disclosure.

FIG. 6 is a diagram of an embodiment of a display screen 169 that displays symbols 171 for accessing multiple mobile applications for playing multiple games. The display screen 169 is a display screen of a mobile device, e.g., a cell phone, tablet, a smart phone, etc., and is an example of the display screen of a client device, e.g., any of the client devices 150 (FIG. 1).

One of the symbols 171 is accessed on the mobile device to access a mobile game application to play a game that is offered by the game developer. For example, a user selects the symbol $171_1$ to access game 1 or selects the symbol $171_2$ to access game 2. In various embodiments, the mobile game applications are stored within one or more memory devices of one of the client devices 151.

In a number of embodiments, a mobile application has a different layout than a web application. For example, the mobile application is developed for a smaller display screen than a display screen on which the web application is displayed. As another example, the mobile application is developed for a limited amount of controls and inputs from a user compared to the web application. In several embodiments, a mobile application is not being rendered within a browser. In these embodiments, users visit device-specific portals, e.g., Apple's™ App store, Android™ Market, or Blackberry App World™ to find and download a mobile application for a given operating system. In a number of embodiments, a mobile application is not cross-compatible as all mobile devices run proprietary operating systems. In these embodiments, a web application is cross-compatible across desktop computers or laptop computers. In various embodiments, a mobile application has less functionality than a web application. The lesser function is a result of lesser computing power in a mobile device compared to a desktop computer or a laptop computer in which a web application is executed. In a number of embodiments, a web application is executed within a mobile device. For example, a web browser is executed by a processor of a gaming device to access a web gaming application on the World Wide Web.

Figure 7:
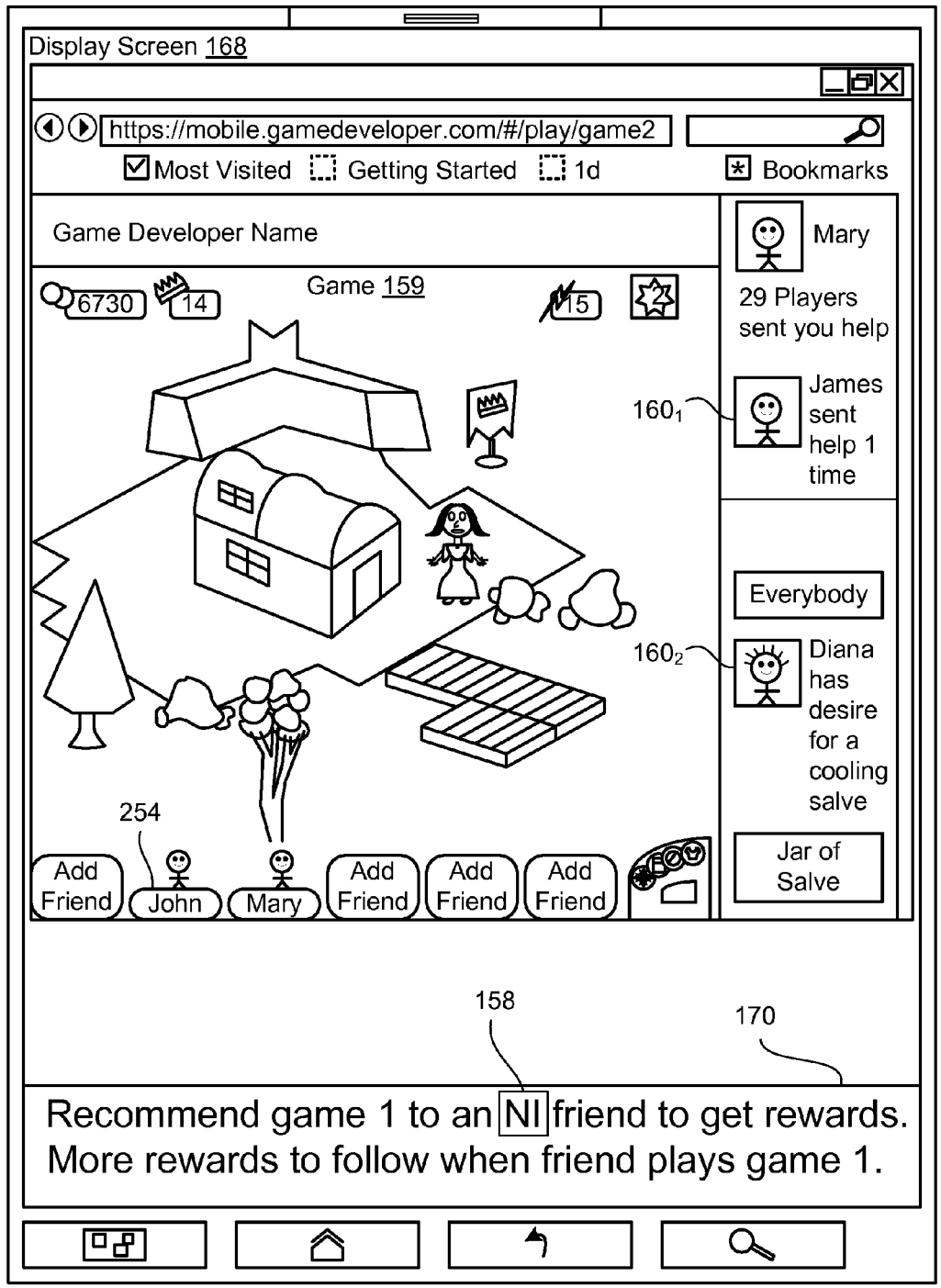
FIG. 7 is a diagram of a display screen that displays a game that is accessed using a web application on a mobile device, in accordance with one embodiment described in the present disclosure

FIG. 7 is a diagram of an embodiment of a display screen 168 that displays a recommendation 170 within a web gaming application. The display screen 168 is a display screen of a mobile device. The display screen 168 is an example of the display screen of the client device 150$_4$ (FIG. 1).

The display screen 168 displays the game 159. Upon logging into the user account 132 and accessing a webpage having a URL "https://mobile.gamedeveloper.com/#/play/game2", the user 4 plays the game 159 on the mobile device. A GPU of the mobile device renders the recommendation data 141 (FIG. 1), which is stored within a real-time messaging file, to display the recommendation 170. Examples of a real-time messaging file include a Flash file. Other examples of a real-time messaging file include an instant message file. For example, when the user 4 is playing the game 159, the recommendation data 141 is received in the form of Flash file data, instant message file data, or a combination thereof, by a NIC of the mobile device. The GPU of the mobile device renders the Flash file data, the instant message file data, or the combination of Flash file data and instant message file data to display the recommendation 170. In various embodiments, instead of being displayed at the bottom of the display screen 168, the recommendation 170 is displayed at the top of the screen 168.

The recommendation 170 has similar subject matter as that of recommendations 156 and 157 (FIG. 5). For example, the recommendation 170 includes a social context of the target friend.

In several embodiments, any word within the recommendation 170 is programmed to receive a selection from the user 4 via the input device of the client device 150$_4$. Upon receiving an indication of the selection, the NIC of the client device 150$_4$ sends the indication via the network 136 to the game provider network 102 (FIG. 1). Upon receiving the indication of the selection, the game provider network 102 generates the offer promotion data 151 (FIG. 1).

It should be noted that in various embodiments, at a time the recommendation 170 is displayed on the display screen 168, the user 4 is not playing or is about to play a game.

Figure 8:
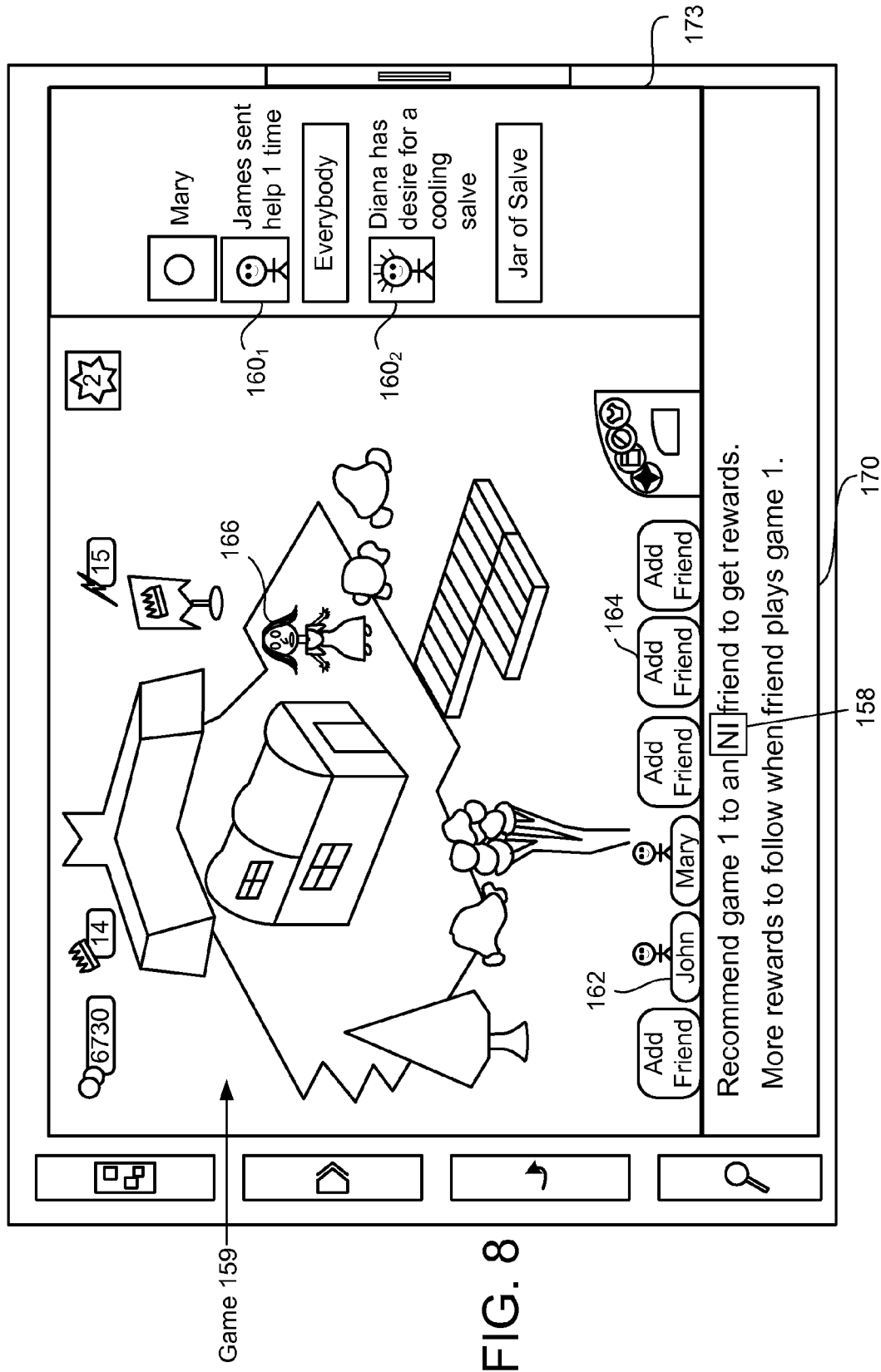
FIG. 8 is a diagram of a display screen that displays a recommendation within a mobile gaming application on a mobile device, in accordance with one embodiment described in the present disclosure.

FIG. 8 is a diagram of an embodiment of a display screen 173 that displays the recommendation 170 within a mobile gaming application. The display screen 173 is a display screen of a mobile device. The display screen 173 is an example of the display screen of the client device 150$_4$ (FIG. 1). In several embodiments, the game 159 is accessed on the display screen 179 when the user 4 selects the game 2 on the display screen 169 (FIG. 6). A GPU of the mobile device renders the recommendation data 141 (FIG. 1), which is stored within a real-time messaging file, to display the recommendation 170.

Figure 9:
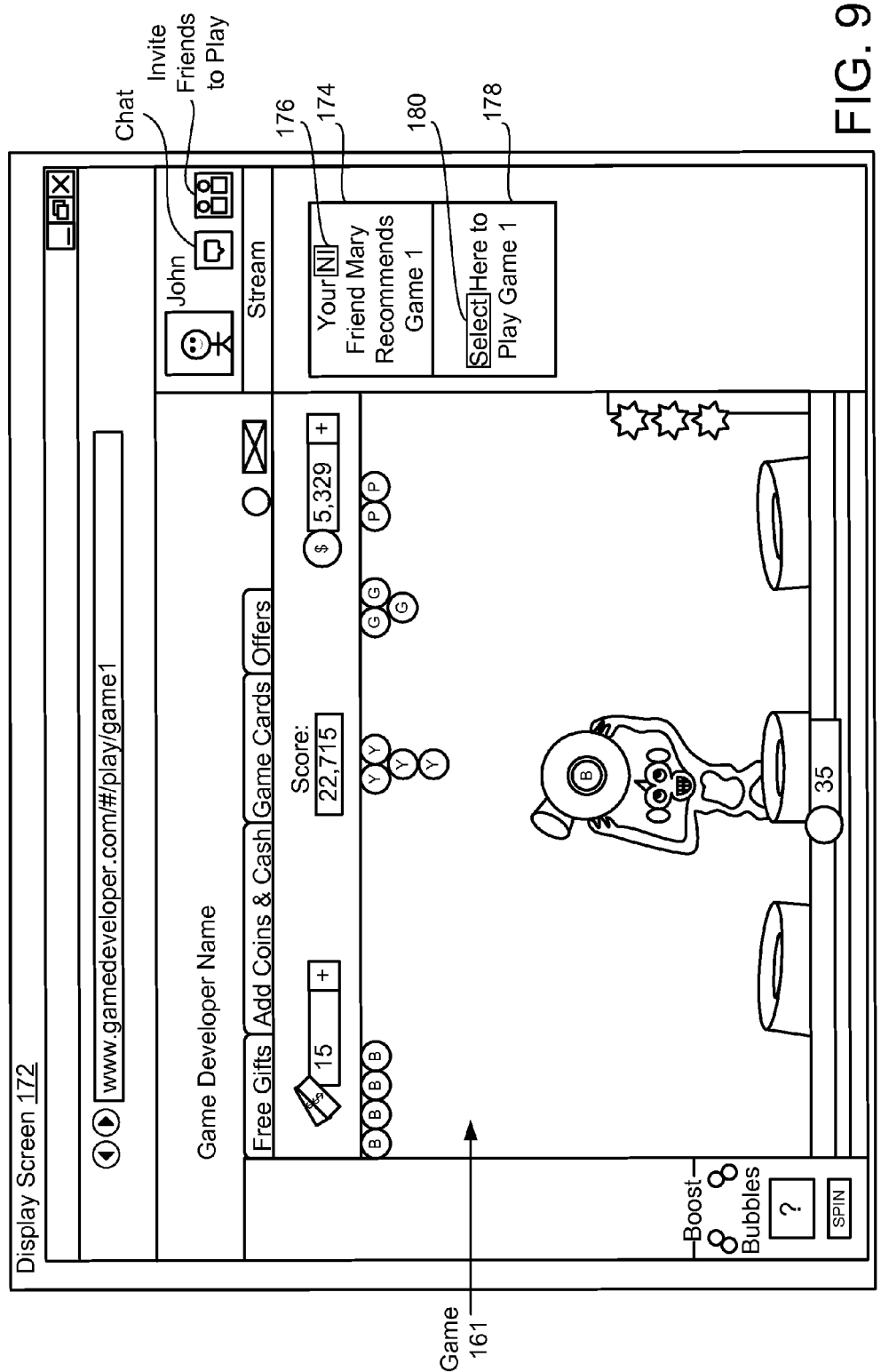
FIG. 9 is a diagram illustrating a suggestion of a game that is recommended by the user to the target friend, in accordance with one embodiment described in the present disclosure.

FIG. 9 is a diagram of an embodiment of a suggestion of the game 1 that is recommended to the target friend by the user 4. The target friend plays a game 161 on a display screen 172. The display screen 172 is an example of the display screen of the client device 150$_1$ (FIG. 1). The target friend accesses the game 161 when the user information regarding the target friend is authenticated by the authentication server and the target friend logs into his/her user account. The game 161 is accessed from the game provider network 102 (FIG. 1).

In the game 161, the target friend controls a virtual monkey via the input device of the client device 150$_1$ to shoot bubbles from a virtual jar towards other virtual bubbles. When a color of the shot virtual bubble matches that of a pre-determined number of other virtual bubbles, all the bubbles of the matched color burst. The bursting may results in an increase in game score, an energy level, and/or a game level of the game 161.

An example of a name of the target friend is John. The display screen 172 displays a chat button that allows John to chat with his/her social network friends and further displays an invite button that allows John to invite his/her social network friends and/or other users to play the game 161. In a number of embodiments, the display screen 172 lacks display of the chat button and/or the invite button.

The display screen 172 displays an offer promotion 174, which is an example of the offer promotion 140 (FIG. 1). The offer promotion 174 indicates to the target friend that the user 4 recommends game 1 to the target friend. Moreover, the offer promotion 174 includes an NI 176, which identifies a social context accessed by the user 4 who recommended game 1. For example, the user 4 accesses a social network identified with the NI 176 to access game 1 or other games from the game network provider 102 (FIG. 1).

The display screen 172 further displays a prompt 178 that indicates to the target friend to select the prompt 178 to access and play game 1. For example, the prompt 178 includes a select button 180. When a selection of the select button 180 is received from the target friend via the input device of the client device 150$_1$, a request for accessing game 1 is sent by the NIC of the client device 150$_1$ via the network 136 to the game provider network 102.

In several embodiments, instead of the selection of the select button 180, any portion of the prompt 178 is selected. When an indication of selection of the portion of the prompt 178 is received, a request for accessing game 1 is sent by the NIC of the client device 150$_1$ via the network 136 to the game provider network 102.

The NIC of the game provider network 102 sends one or more portions of game data of game 1 via the network 136 to the client device 150$_1$. In response to receiving the one or more portions of game 1, the GPU of the client device 1 renders the one or more portions to display information regarding game 1, e.g., an image of game 1, a play button of game 1, etc., on the display screen of the client device 150$_1$.

The target friend plays game 1. For example, the target friend selects a play button displayed on the display screen 172 to play game 1. As another example, the target friend selects an image of game 1 to play the game. As another example, the target friend interacts via the input device of the client device $150_1$ with features, e.g., virtual items, animations, etc., of game 1 to play game 1.

In a number of embodiments, an indication of the play of game 1 by the target friend is sent by the NIC of the client device $150_1$ via the network 136 to the NIC of the game provider network 102. Upon receiving the indication of the play of game 1, a processor of the game provider network 102 generates additional reward data and the NIC of the game provider network 102 sends the additional reward data via the network 136 to the client device $150_4$. The additional reward data is sent to the client device $150_4$ when the user $150_4$ accesses the user account 132 via the network 136. The GPU of the client device $150_4$ processes the additional reward data to display additional rewards on the display screen of the client device $150_4$ and the additional rewards are provided to the user 4.

The additional rewards are provided in addition to providing rewards to the user 4 for recommending game 1 to the target friend and/or the target friend accessing game 1. The additional rewards are provided when the target friend plays game 1.

In several embodiments, the prompt 178 is a part of the offer promotion 174. It should be noted that in various embodiments, at a time the offer promotion 174 and prompt 178 are displayed on the display screen 172, the target friend is not playing or is about to play a game.

Figure 10:
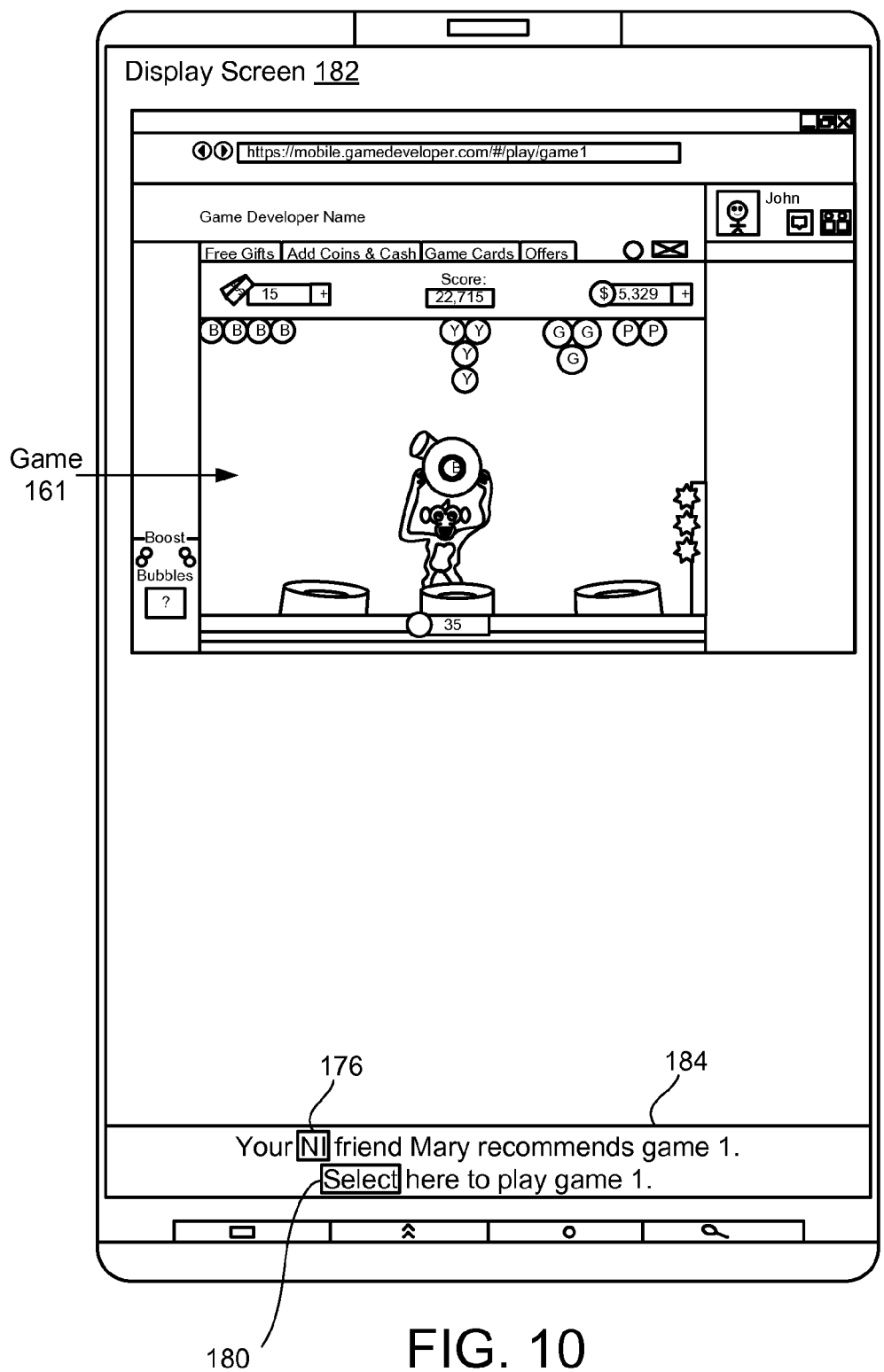
FIG. 10 is a diagram of a display screen that displays a recommendation within a web application on a mobile device to the target friend, in accordance with one embodiment described in the present disclosure.

FIG. 10 is a diagram of an embodiment of a display screen 182 that displays an offer promotion 184 and the game 161 on a mobile device upon execution of a web gaming application. The display screen 182 is an example of the display screen of the client device $150_1$ (FIG. 1). A GPU of the mobile device renders the offer promotion data 151 (FIG. 1), which is stored within a real-time messaging file, to display the offer promotion 184, which is an example of the offer promotion 140. For example, when target friend is playing the game 161, the offer promotion data 151 is received in the form of Flash file data, instant message file data, or a combination thereof, by a NIC of the mobile device. Upon logging into his/her user account and accessing a webpage having a URL "https://mobile-.gamedeveloper.com/#/play/game1", the target friend plays the game 161 on the mobile device. The GPU of the mobile device renders the Flash file data, the instant message file data, or the combination of Flash file data and instant message file data to display the offer promotion 184. In various embodiments, instead of being displayed at the bottom of the display screen 182, the offer promotion 184 is displayed at the top of the screen 182.

The offer promotion 184 has similar subject matter as that of offer promotion 174 and the prompt 178 (FIG. 9). For example, the offer promotion 184 includes a social context of the user 4 that recommended game 1 to the target friend.

It should be noted that in various embodiments, at a time the offer promotion 184 is displayed on the display screen 182, the target friend is not playing or is about to play a game.

Figure 11:
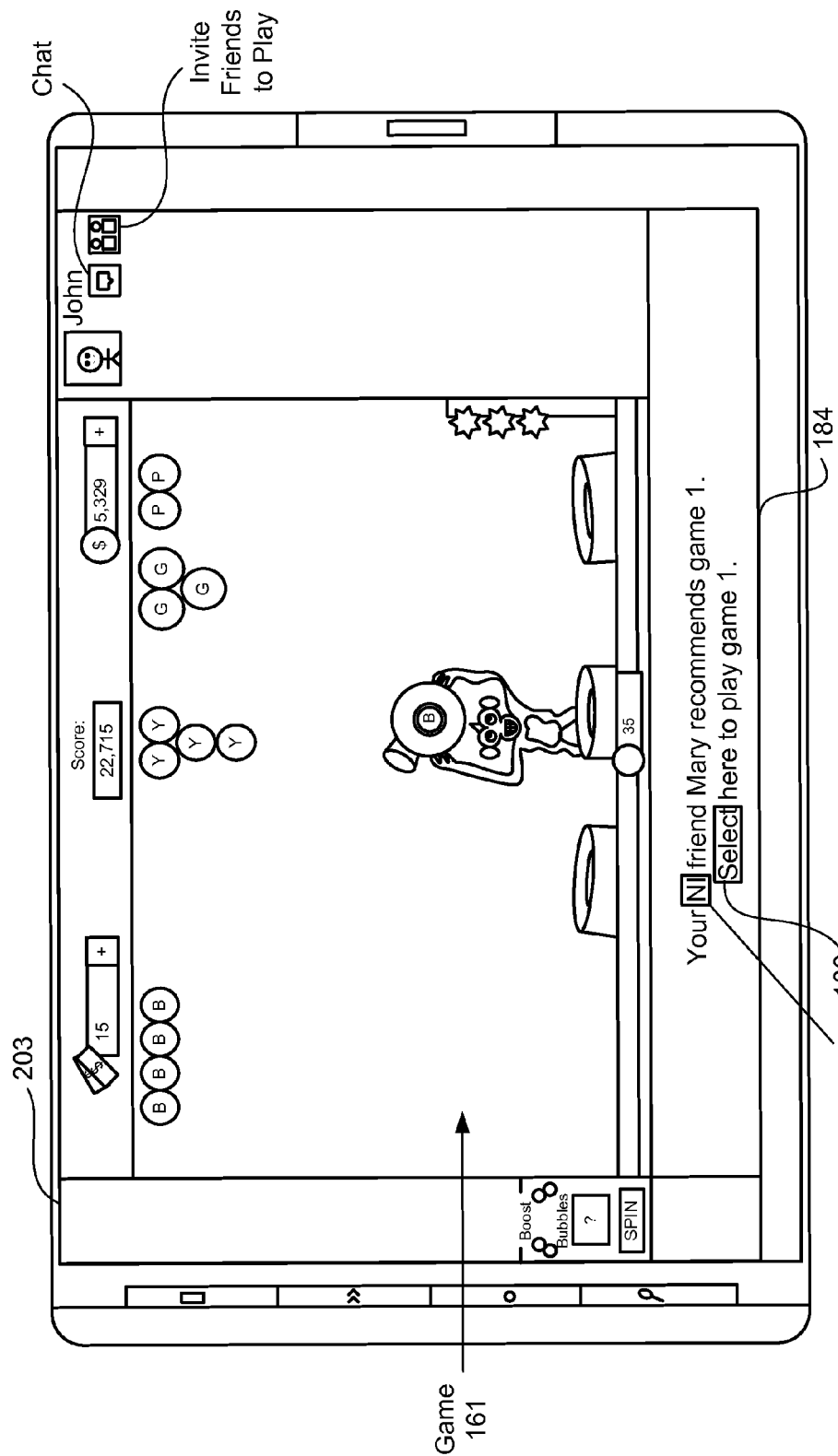
FIG. 11 is a diagram of a display screen that displays a recommendation within a mobile application on a mobile device to the target friend, in accordance with one embodiment described in the present disclosure.

FIG. 11 is a diagram of an embodiment of a display screen 203 that displays the offer promotion 184 and the game 161 within a mobile gaming application on a mobile device. The display screen 203 is a display screen of a mobile device. The display screen 203 is an example of the display screen of the client device $150_1$ (FIG. 1). In several embodiments, the game 161 is accessed on the display screen 203 when the user 1 selects the game 1 on the display screen 169 (FIG. 6). A GPU of the mobile device renders the offer promotion data 151 (FIG. 1), which is stored within a real-time messaging file, to display the offer promotion 184.

Figure 12:
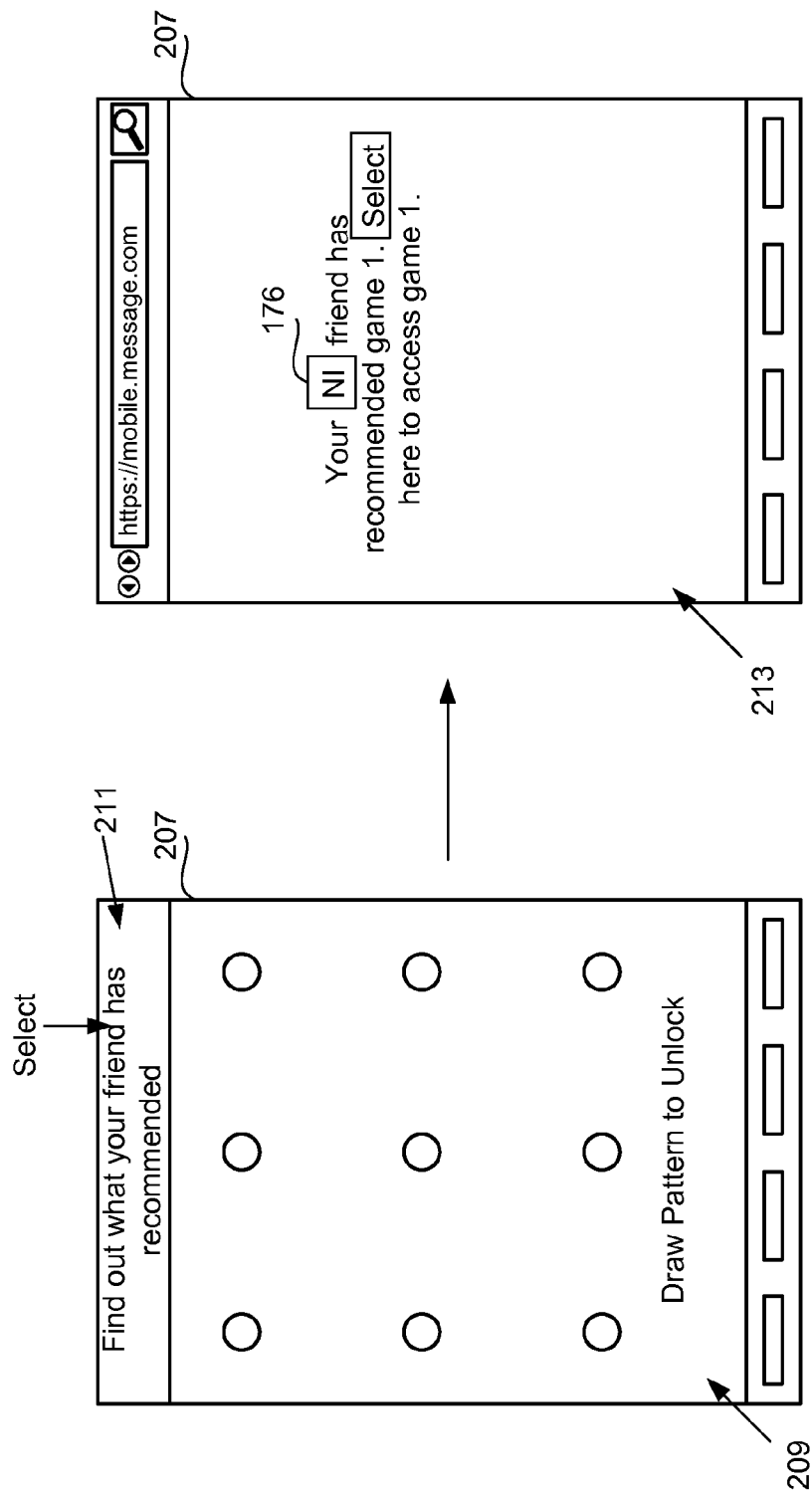
FIG. 12 is a diagram of a display screen that displays a pattern of circles used to illustrate a suggestion of the game to the target friend, in accordance with one embodiment described in the present disclosure.

FIG. 12 is a diagram of an embodiment of the display screen 207 that displays a pattern 209 of circles, which are used to illustrate a suggestion of the game 145. The display screen 207 is an example of the display screen of the client device $150_1$ (FIG. 1). The GPU of the client device $150_1$ displays the pattern 209 after the target friend has logged into his/her user account and has not used the client device $150_1$ (FIG. 1) for a preset period of time. When the pattern 209 is displayed, the NIC of the game provider network 102 (FIG. 1) sends the offer promotion data 151 (FIG. 1) via the network 136 to the NIC of the client device $150_1$.

Upon receiving the offer promotion data 151 via the NIC of the client device $150_1$, the GPU of the client device $150_1$ renders the offer promotion data 151 to display a message 211 at the top of the display screen 193. The message 211 invokes curiosity of the target friend to find out what the user 4 has to recommend. When the target friend unlocks the pattern 209 via the input device of the client device $150_1$ and selects the message 211 via the input device, a web page 213 is displayed on the display screen 207 by the GPU of the client device $150_1$. The web page 213 has a URL "https://mobile.message-.com". The web page 213 includes a message that conveys that the user 4 has recommended game 1 and provides a select button that can be selected by the target friend to access and play game 1.

In several embodiments, instead of displaying the pattern 209, a news web page that shows news, a shopping web page that shows shopping items, a search results web page that shows results of a web search, a search query web page that shows a search engine, or any other web page available on the World Wide Web, is displayed.

Figure 13:
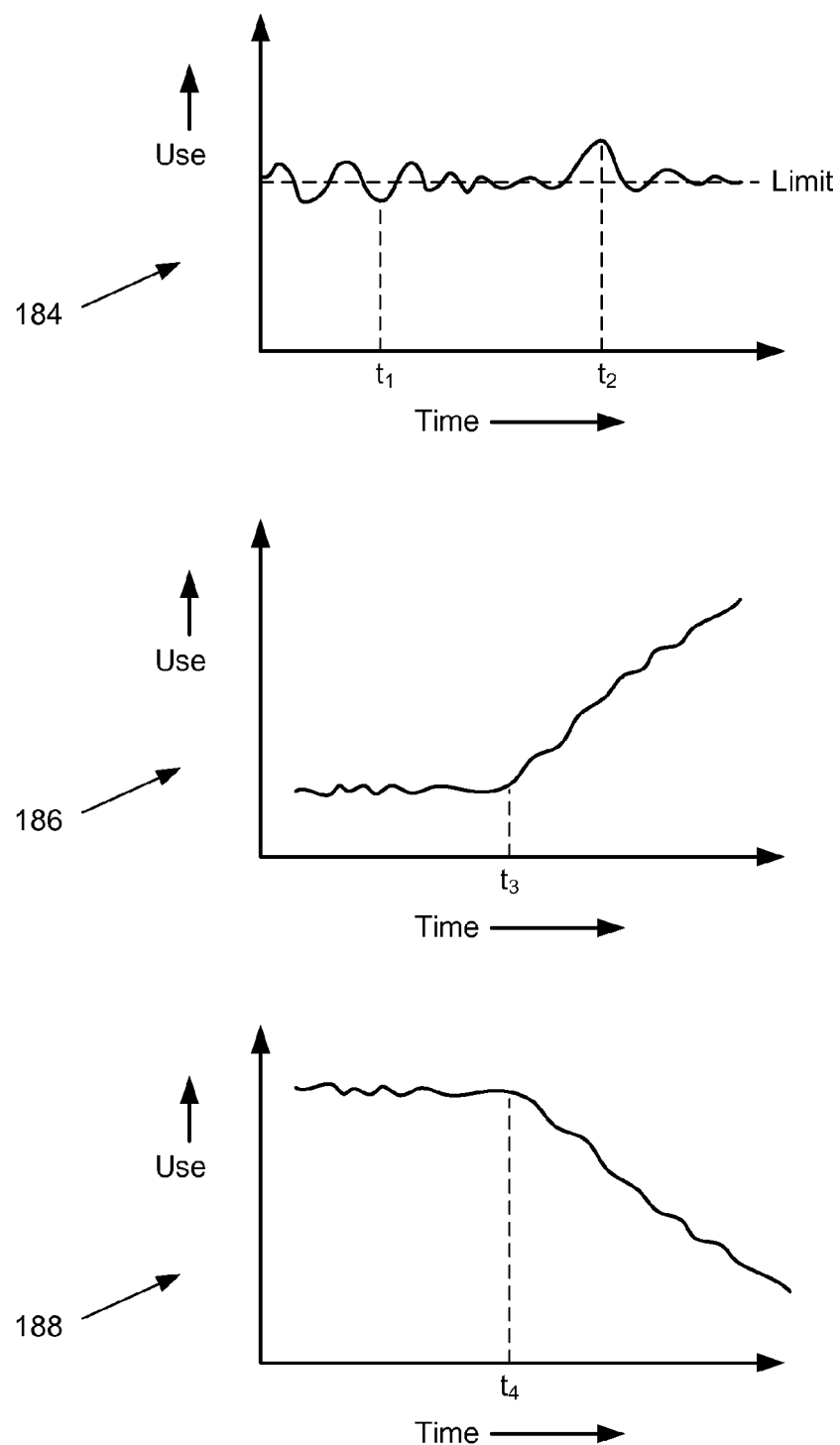
FIG. 13 is a diagram of multiple graphs used to illustrate a dynamic change in recommendation with a change in use of a game by users within one or more networks, in accordance with one embodiment described in the present disclosure.

FIG. 13 is a diagram of an embodiment of multiple graphs 184, 186, and 188 used to illustrate a dynamic change in use of the game 145 (FIG. 1). The graph 184 plots a use of the game 145 by the users 2 thru 4 (FIG. 1) versus time t. The use of the game 145 is dynamically changing over time. For example, the use of the game 145 at a time t1 is below a use limit and the use of the game 145 at a time t2 is above the use limit. A processor of the game provider network 102 (FIG. 1) determines at the time t1 that the use is below the use limit and avoids generating the recommendation data 141 (FIG. 1) regarding the game 145. Moreover, a processor of the game provider network 102 determines at the time t2 that the use is above the use limit, generates the recommendation data 141, and sends the recommendation data 141 to the client device $150_4$ (FIG. 1).

As shown in the graph 186, the use of the game 145 by the users 2 thru 4 increases linearly after a time t3. A processor of the game provider network 102 determines after the time t3 that the use increased linearly after the time t3 and increases, after the time t3, a frequency with which the recommendation data 141 is sent by the NIC of the game provider network 102 to the client device $150_4$. The GPU of the client device $150_4$ renders the recommendation data 141 to display the recommendation 108 each time the recommendation data 141 is received by the NIC of the client device $150_4$. The frequency is increased compared to a frequency of sending the recommendation data 141 before the time t3.

Also, as shown in the graph 188, the use of the game 145 decreases linearly after a time t4. A processor of the game provider network 102 determines after the time t4 that the use decreased linearly after the time t4 and decreases, after the time t4, a frequency with which the recommendation data 141 is sent by the NIC of the game provider network 102 to the client device $150_4$. The frequency is decreased compared to a frequency of sending the recommendation data 141 before the time t4.

In several embodiments, instead of the linear change in the frequency shown in the graphs 186 and 188, an exponential or a step function change in the frequency can be used.

In some embodiments, the change in use of the game 145 by the users 2 thru 4 after the times t3 and t4 is a result of an application by a processor of the game provider network 102 of different factors to determine the use compared to before the times t3 and t4. For example, a processor of the game provider network 102 applies a first combination of factors to determine use of the game 145 before the time t3 or t4 and applies a second combination of factors to determine use of the game 145 after the time t3 or t4. To illustrate, the second combination of factors includes whether the users 2 thru 4 paid to play the game 145 and whether each of the users 2 thru 4 played the game 145 for a higher number of gaming sessions during a time period than that used to play the other games during the time period. In this illustration, the first combination of factors includes whether each of the users 2 thru 4 mentioned the game 145 for a higher number of times than mentioning the other games and whether each of the users 2 thru 4 accessed the game 145 for a higher number of times than accessing games other than the game 145.

It should be noted that in several embodiments, any comparison of portions of the group data 135 (FIG. 1) is a factor. For example, if the users 2 thru 4 and the target user have the same or similar age is a factor. As another example, whether the users 2 thru 4 paid to play the game 145 is another factor.

Figure 14:
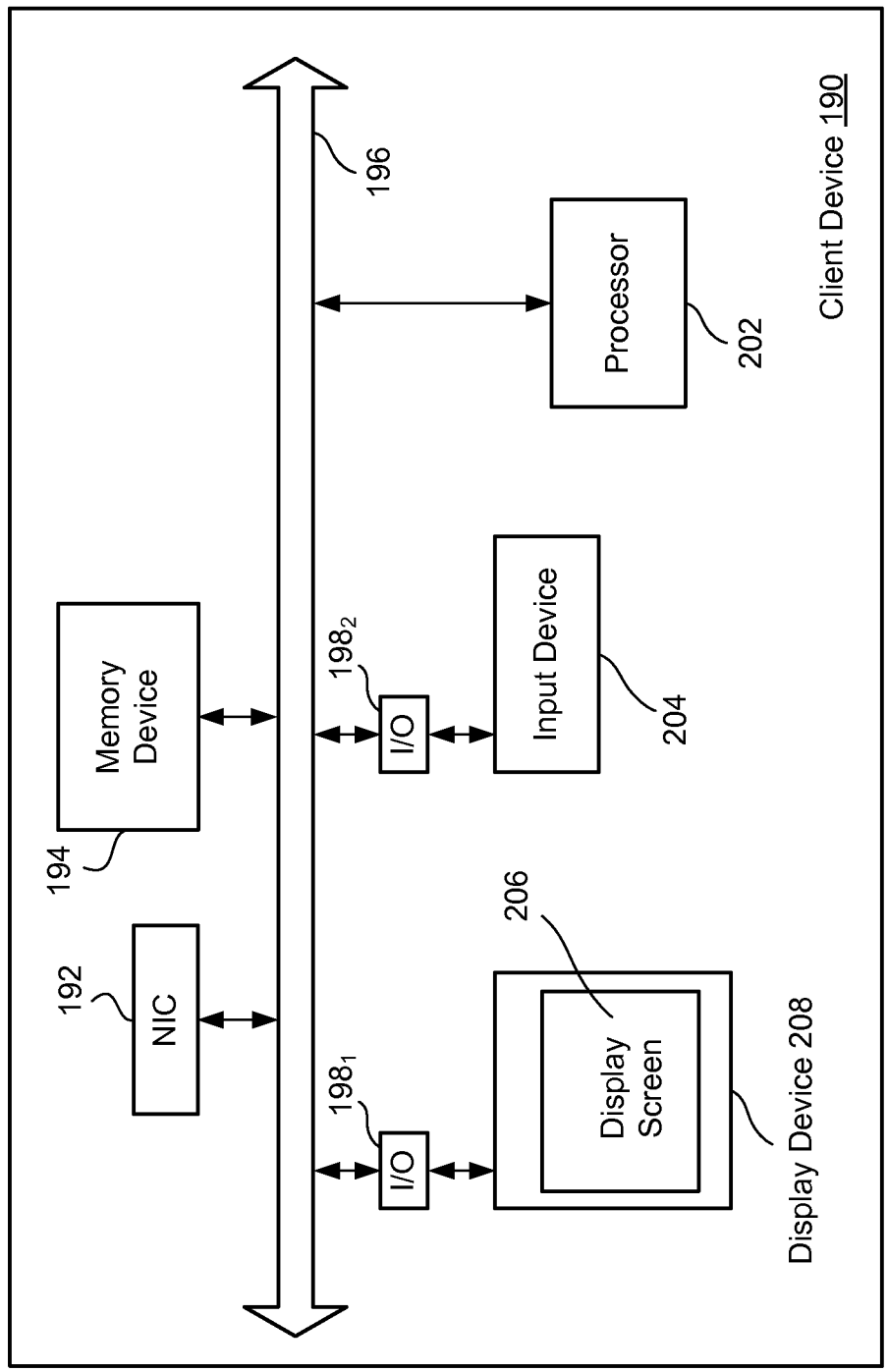
FIG. 14 is a block diagram of a client device, in accordance with one embodiment described in the present disclosure.

FIG. 14 is a block diagram of an embodiment of a client device 190, which is an example of any of the client devices 150 (FIG. 1). The client device 190 includes a display device 208 that is coupled with a bus 196 via an input/output interface (I/O) $198_1$. Examples of the display device 208 include an LED display device, an LCD display device, a plasma display device, and a CRT display device. The display device 208 includes a display screen 206. The display screen 154 of FIG. 5, the display screen 168 of FIG. 8, the display screen 172 of FIG. 9, the display screen 182 of FIG. 10, or the display screen 207 of FIG. 12 is an example of the display screen 206.

An input device 204 of the client device 190 is coupled with the bus 196 via an I/O $198_2$. An I/O interface that is coupled with two devices provides compatibility between the two devices. For example, the I/O interface $198_1$ matches a rate of transfer of data to/from the display device 208 with a rate of transfer of data over the bus 196. As another example, the I/O device $198_2$ converts analog signals received from the input device 204 into digital signals that are compatible with the bus 196. Moreover, a processor 202, a memory device 194, and a NIC 192 are coupled with the bus 196.

Figure 15:
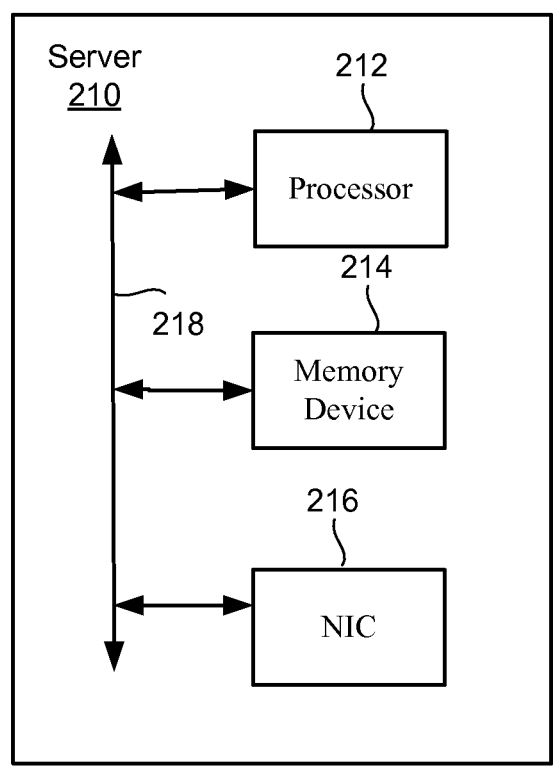
FIG. 15 is a block diagram of a server, in accordance with one embodiment described in the present disclosure.

FIG. 15 is a block diagram of an embodiment of a server 210. The server 210 may be a part of the game provider network 210 or the social network 134 (FIG. 1). In several embodiments, the server 210 is the authentication server. The server 210 includes a processor 212, a memory device 214, and a NIC 216. The processor 212, the memory device 214, and the NIC 216 are coupled with each other via a bus 218. In several embodiments, the server 210 includes any number of processors and memory devices.

Embodiments described in the present disclosure may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

With the above embodiments in mind, it should be understood that the embodiments can employ various computer-implemented operations involving data stored in computer systems. These operations are those requiring physical manipulation of physical quantities. Any of the operations described herein are useful machine operations. The present disclosure also relates to a device or an apparatus for performing these operations. The apparatus can be specially constructed for a specific purpose. The apparatus is selectively activated or configured by a computer program stored in the computer.

In one embodiment, a module or an engine, as used herein, is embodied as computer-readable code on a computer-readable medium. The computer-readable medium is any data storage device that can store data, which can be thereafter be read by a computer. Examples of the computer-readable medium include hard drives, network attached storage (NAS), ROM, RAM, compact disc-ROMs (CD-ROMs), CD-recordables (CD-Rs), CD-rewritables (RWs), magnetic tapes and other optical and non-optical data storage devices. The computer-readable medium can include computer-readable tangible medium distributed over a network-coupled computer system so that the computer-readable code is stored and executed in a distributed fashion.

Although the method operations were described in a specific order in FIGS. 2 and 3, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the appended claims.

What is claimed is:

1. A method for providing recommendations of online games to friends of social network, comprising:
   identifying a gaming session of a user on an online game provider network;
   accessing a use profile of the user for the online games of the online game provider network;
   accessing a social graph of the user to identify friends of the user and respective friend profiles from the social network;
   producing a recommendation of an online game, the recommendation including identification of a target friend of the user, the recommendation being provided by examination of the use profile of the user and the friend profiles in the social graph;
   providing the recommendation to the user, the recommendation including an offer incentive to the user to share the recommendation with the target friend; and
   receiving an indication that the recommendation is shared by the user with the target friend,
   wherein the method is executed by one or more processors.

2. The method of claim 1, wherein the examination further includes examination of use profiles of online games of the friends of the user.

3. The method of claim 1, wherein identifying the gaming session of the user comprises determining that the user logged into the online game provider network and is playing a game.

4. The method of claim 1, wherein accessing the use profile of the user for the online games comprises obtaining data regarding usage of the online games by the user via a user account of the user, the user account used to access the online games.

5. The method of claim 1, wherein accessing the social graph of the user and the respective friend profiles comprises accessing user identities of social network friends of the user, the social network friends accessing the online game provider network via the social network.

6. The method of claim 1, wherein producing the recommendation of the online game comprises generating a suggestion including an identification of the online game to provide to the target friend, wherein the recommendation is based on use profiles of the friends, the use profiles indicating use of the online games by the friends.

7. The method of claim 1, wherein providing the recommendation to the user includes sending the recommendation via a network to a client device, the client device operated by the user to access a user account, the offer incentive including item data to provide to the user when the user recommends the online game to the target friend.

8. A system for providing recommendations of online games to friends of a social network, comprising:
a memory device for storing a use profile of a user for the online games of an online game provider network;
a processor for identifying a gaming session of the user on the online game provider network,
the processor for accessing the use profile of the user for the online games,
the processor for accessing a social graph of the user to identify friends of the user and respective friend profiles from the social network,
the processor for producing a recommendation of an online game, the recommendation including identification of a target friend of the user, the recommendation being provided by examination of the use profile of the user and the friend profiles in the social graph, the recommendation including an offer incentive to the user to share the recommendation with the target friend;
the processor for receiving an indication that the recommendation is shared by the user with the target friend.

9. The system of claim 8, wherein the examination further includes examination of the use profiles of online games of the friends of the user.

10. The system of claim 8, wherein the processor is further configured to determine whether the user logged into the online game provider network and is playing a game.

11. The system of claim 8, wherein the processor is further configured to obtain data regarding use of the online games by the user via a user account of the user, the user account used to access the online games.

12. The system of claim 8, wherein the processor is further configured to access user identities of social network friends of the user, the social network friends accessing the online game provider network via the social network.

13. The system of claim 8, wherein the processor is further configured to generate a suggestion of an identification of the online game to provide to the user, wherein the recommendation is based on the use profiles of the friends, the use profiles indicating use of the online games by the friends.

14. The system of claim 8, wherein the processor is further configured to send the recommendation via a network to a client device, the client device operated by the user to access a user account, the offer incentive including item data to provide to the user when the user recommends the online game to the target friend.

15. A method for providing recommendations of online games to friends of a social network, comprising:
identifying a gaming session of a user on an online game provider network;
accessing a use profile of the user for the online games of the online game provider network;
accessing a social graph of the user to identify friends of the user and respective friend profiles from the social network;
producing a recommendation of an online game, the recommendation including identification of a target friend the user, the recommendation being provided by examination of the use profile of the user and friend profiles in the social graph;
providing the recommendation to the user, the recommendation including an offer incentive to the user to share the recommendation with the target friend;
determining whether the recommendation is shared by the user with the target friend;
providing a reward within the offer incentive to the user upon determining that the recommendation is shared with the target friend;
determining whether the target friend accessed the online game; and
sending an offer promotion for the target friend upon determining that the target friend accessed the online game,
wherein the method is executed by one or more processors.

16. The method of claim 15, wherein determining whether the recommendation is shared with the target friend comprises determining whether an indication that a suggestion of the online game is sent to a user account of the target friend is received.

17. The method of claim 15, wherein determining whether the target friend accessed the online game comprises determining whether an indication of a download of a portion of the online game is received from a client device, the client device operated to access the online game.

18. The method of claim 15, wherein sending the offer promotion for the target friend comprises sending rewards related to the online game to a client device, the client device operated to access the online game.

19. The method of claim 15, wherein the examination further includes examination of the use profile of online games of the friends of the user.

20. The method of claim 15, wherein identifying the gaming session of the user is performed after determining whether the user logged into the online game provider network.

21. The method of claim 1, wherein the recommendation includes an identifier of the social network and a number of social network friends recommending the online game to the target friend.

22. The method of claim 1, wherein the offer incentive includes an incentive associated with the online game.

* * * * *